United States Patent
Lim et al.

(10) Patent No.: US 12,149,407 B2
(45) Date of Patent: Nov. 19, 2024

(54) SYSTEM AND METHOD FOR TRANSFERRING CONFIGURATION, MANAGEMENT, DEBUG INFORMATION AND ASYNCHRONOUS EVENTS BETWEEN NETWORK-ON-CHIP (NOC) AND EXTERNAL INTERFACE

(71) Applicant: SKYECHIP SDN BHD, Bayan Lepas (MY)

(72) Inventors: Soon Chieh Lim, Bayan Lepas (MY); Chuen Heong Khuan, Bayan Lepas (MY); Chee Hak Teh, Bayan Lepas (MY)

(73) Assignee: SKYECHIP SDN BHD, Bayan Lepas (MY)

( * ) Notice: Subject to any disclaimer, the term of this patent is extended or adjusted under 35 U.S.C. 154(b) by 104 days.

(21) Appl. No.: 18/062,776

(22) Filed: Dec. 7, 2022

(65) Prior Publication Data

US 2024/0129183 A1    Apr. 18, 2024

(30) Foreign Application Priority Data

Oct. 12, 2022    (MY) .............................. PI2022005661

(51) Int. Cl.
*H04L 41/0803*    (2022.01)
*H04L 49/109*    (2022.01)
*H04L 67/00*    (2022.01)

(52) U.S. Cl.
CPC ........ *H04L 41/0803* (2013.01); *H04L 49/109* (2013.01); *H04L 67/34* (2013.01)

(58) Field of Classification Search
CPC .......................... H04L 41/0803; H04L 49/109
See application file for complete search history.

(56) References Cited

U.S. PATENT DOCUMENTS

| 8,798,038 | B2 * | 8/2014 | Jayasimha | H04L 45/00 370/352 |
| 10,944,693 | B2 | 3/2021 | Bharadwaj et al. | |
| 2015/0319106 | A1 * | 11/2015 | Lemaire | H04L 49/109 370/254 |
| 2016/0344629 | A1 * | 11/2016 | Gray | H04L 49/106 |
| 2017/0060809 | A1 * | 3/2017 | Norige | H04L 49/109 |

FOREIGN PATENT DOCUMENTS

CN        112597075        4/2021

\* cited by examiner

*Primary Examiner* — Minh Chau Nguyen
(74) *Attorney, Agent, or Firm* — HSML P.C.

(57) ABSTRACT

The present invention relates to a system and method for transferring configuration, management, debug information and asynchronous events between network-on-chip (NOC) and external interface, wherein said system, referred to as secondary network (101), comprises of a plurality of configuration bus (CBUS) network elements such as a master network element (103) and a plurality of basic network elements (105); whereby said secondary network (101) is capable to convey events such as request, acknowledge assertions or de-assertions, saving the need for numerous wires connecting between main NOC elements such as nodes or routers.

35 Claims, 25 Drawing Sheets

SYSTEM AND METHOD FOR TRANSFERRING CONFIGURATION, MANAGEMENT, DEBUG INFORMATION AND ASYNCHRONOUS EVENTS BETWEEN NETWORK-ON-CHIP (NOC) AND EXTERNAL INTERFACE

1. TECHNICAL FIELD OF THE INVENTION

The present invention relates to a system and method for transferring configuration, management, debug information and asynchronous events between network-on-chip (NOC) and external interface, wherein said system, referred to as secondary network, comprises of a plurality of configuration bus (CBUS) network elements such as a master network element and a plurality of basic network elements; whereby said secondary network is capable to convey events such as request, acknowledge assertions or de-assertions, saving the need for numerous wires connecting between main NOC elements such as nodes or routers.

2. BACKGROUND OF THE INVENTION

Network-on-chip's main functionality is to transmit packetized information within a system-on-chip (SoC), such as carrying write request and write data from a central processing unit (CPU) to a memory storage. Every NOC comprises of two basic components. The first basic component is node, which provides an interface for intellectual property (IP) blocks to access the network-on-chip (NOC). Interface protocols such as Advanced Microcontroller Bus Architecture Advanced eXtensible Interface (AMBA AXI) is converted into smaller NOC packets known as flits. The flits are then sent into the NOC network. Another basic component of the NOC is router, which is capable to connect with other routers to establish a larger NOC topology, such as mesh topology, ring topology, or others. Each router is also capable to be connected to at least one node. The router is responsible for routing flits to the correct path via routing information deciphering.

SRIKANT BHARADWAJ P et al, U.S. Ser. No. 10/944,693B2, disclosed a system that includes an integrated circuit chip having a network-on-chip further comprising a separate sideband channel coupled between each router and each of one or more neighboring routers of that router among the plurality of routers in the topology, wherein each router communicates operating state information to one or more neighboring routers of that router using respective sideband channels. However, the sideband channel of the prior art may only support a fixed topology, or a limited number of different topologies. Existing networks also have fixed parameters which cannot be changed during run-time (i.e., not real-time configurable).

YANG PING, CN112597075A, disclosed a cache allocation method for a router, a network-on-chip and electronic equipment. However, said prior art could introduce too much overhead, too area-intensive or routing-intensive, making it not scalable.

Hence, it would be advantageous to alleviate the shortcomings by having a system and method for transferring configuration, management, debug information and asynchronous events between NOC and external interface, whether it is within the same secondary network or across multiple integrated circuits (ICs), which is scalable and light weight.

3. SUMMARY OF THE INVENTION

Accordingly, it is the primary aim of the present invention to provide a system and method for transferring configuration, management, debug information and asynchronous events between NOC and external interface, which is light weight, whereby the interface signals are as low as four signals.

It is yet another objective of the present invention to provide a system and method for transferring configuration, management, debug information and asynchronous events between NOC and external interface, which provides a single-master topology with broadcast-based packet traversal, wherein no routing information is required to traverse the network.

It is yet another objective of the present invention to provide a system and method for transferring configuration, management, debug information and asynchronous events between NOC and external interface, whereby said system of secondary network can convey traditionally wired events between main NOC elements, such as request, acknowledge assertions or de-assertions, by encapsulating the wired events within the secondary network data packets, thus saving wires crisscrossing between the main NOC elements.

It is yet another objective of the present invention to provide a system and method for transferring configuration, management, debug information and asynchronous events between NOC and external interface, which is scalable due to the implementation of dynamic discovery and stubbing mechanism for new nodes to be added or removed from said secondary network.

It is yet another objective of the present invention to provide a system and method for transferring configuration, management, debug information and asynchronous events between NOC and external interface, which is capable to implement dynamic enumeration mechanism for addressing a whole cluster of nodes across the chip or chip boundary.

Additional objects of the invention will become apparent with an understanding of the following detailed description of the invention or upon employment of the invention in actual practice.

According to the preferred embodiment of the present invention the following is provided:

A secondary network, comprising of:
a master network element;
characterized in that
said secondary network further comprises of a plurality of basic network elements;
wherein said secondary network connecting at least one network-on-chip (NOC) and external interface.

In another embodiment of the invention there is provided:

A method of transferring configuration, management, debug information and asynchronous events between at least one network-on-chip (NOC) and external interface, comprising the steps of:

i. at least one second configuration bus (CBUS) network element of at least one secondary network sending transmit credit signal of '1' through at least one transmits credit channel (txcredit) to at least one first CBUS network element in clock cycle equivalent to amount of bit storage available in said second CBUS network element for said first CBUS network element to send data;

ii. said first CBUS network element transferring data through at least one transmits data channel (txdata) to said second CBUS network element;

iii. if said data transferred through said transmit data channel (txdata) from said first CBUS network element to said second CBUS network element when said first CBUS network element transmitting transmit valid signal of '1' through at least one transmits valid channel (TX valid) to said second CBUS network element, said second CBUS network element accepting said data as valid;

wherein said steps (i) to (iii) are also done for communication in the opposite direction, whereby said first CBUS network element sending transmit credit signal of '1' through at least one receive credit channel (rxcredit) to said second CBUS network element, said second CBUS network element transferring data through at least one receive data channel (rxdata) to said first CBUS network element, and if said data transferred through said receive data channel (rxdata) from said second CBUS network element to said first CBUS network element when said second CBUS network element transmitting receive valid signal of '1' through at least one receive valid channel (rxvalid) to said first CBUS network element, said first CBUS network element accepting said data as valid.

4. BRIEF DESCRIPTION OF THE DRAWINGS

Other aspect of the present invention and their advantages will be discerned after studying the Detailed Description in conjunction with the accompanying drawings in which:

FIG. 4A is a diagram of an example of the write request data packet, while FIG. 4B is a diagram of an example of the read request data packet, while

FIG. 5A is a circuit diagram showing the components of a basic network element (105) while

FIG. 6A is a block diagram showing an example of a targeted write request packet sent from the master network element to basic network element 3, while

FIG. 12A is a block diagram showing an example of usage of I/O buffers to send CBUS signals across multiple chiplets, while

5. DETAILED DESCRIPTION OF THE DRAWINGS

In the following detailed description, numerous specific details are set forth in order to provide a thorough understanding of the invention. However, it will be understood by the person having ordinary skill in the art that the invention may be practised without these specific details. In other instances, well known methods, procedures and/or components have not been described in detail so as not to obscure the invention.

The invention will be more clearly understood from the following description of the embodiments thereof, given by way of example only with reference to the accompanying drawings, which are not drawn to scale.

The present invention proposes a sideband or secondary network (101), called the configuration bus network (CBUS) to complement the main network-on-chip (NOC) elements such as nodes or routers. The secondary network (101) is used to convey configuration, debug, message and interrupt information between the main NOC's elements and the CBUS master network element (103). The CBUS master element is just like any other CBUS elements except that it is connected to the external interface. The external interface could be a central processing unit (CPU), microcontroller, manager, or others.

Figure 1:
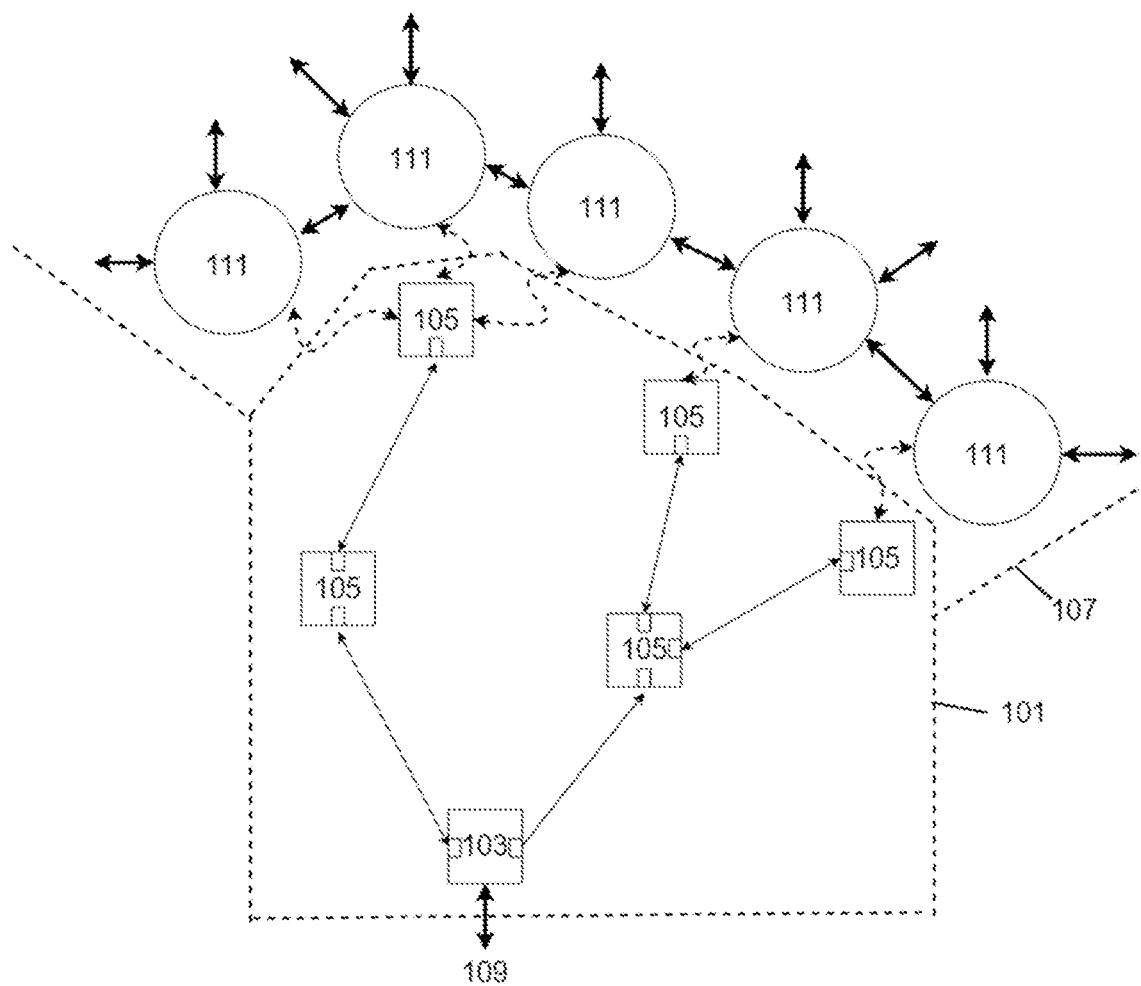
FIG. 1 is block diagram of the system of the present invention.

As shown in FIG. 1, the present invention is a secondary network (101), comprising of: a master network element (103); characterized in that said secondary network (101) further comprises of a plurality of basic network elements (105); wherein said secondary network (101) connecting at least one network-on-chip (NOC) (107) and external interface (109). The master network element (103) or basic network element (105) can be categorized as CBUS network element (201). The NOC (107) comprises of at least one NOC element (111). The NOC element (111) comprises of at least one main router, at least one request node (111A), at least one home node (111B) or combination thereof.

Figure 5A:
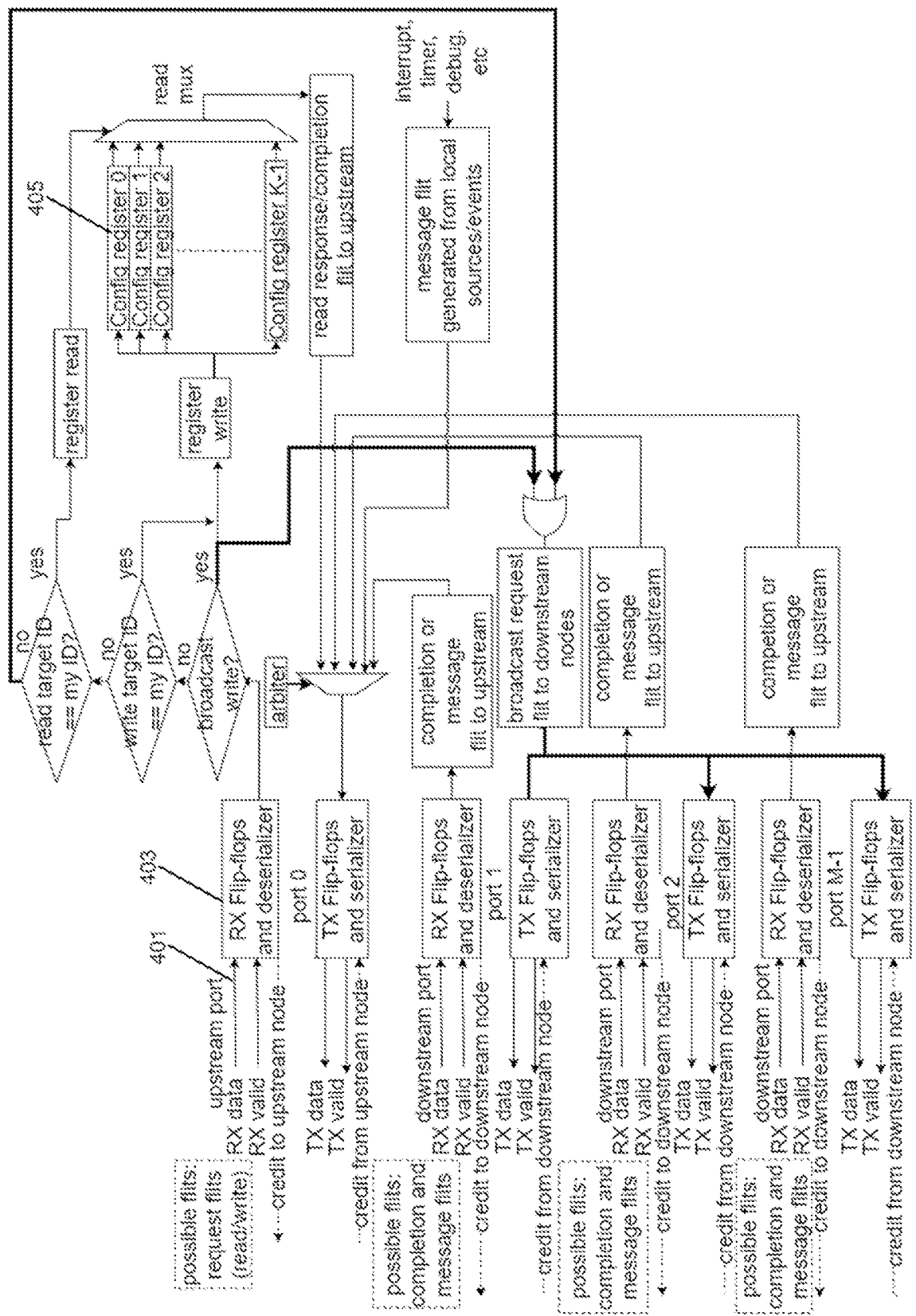

As shown in FIG. 5A, the basic network element (105) comprises of at least one port (401) capable of being in connection with at least one port of another network element (103, 105); at least one first-in-first-out (FIFO) buffer (403) connected to said port (401) buffering data being transmitted from or received by said port (401); at least one arbiter (407) connected to said FIFO buffer (403) selecting data packets to be transmitted from said port (401); at least one configuration register (405) connected between said FIFO buffer (403) and said arbiter (407).

One basic network element (105) may comprise of an upstream port (401A) facing the direction of said master network element (103) and optionally at least one downstream port (401B) connected to the upstream port (401A) of neighbouring basic network element (105).

Figure 5B:
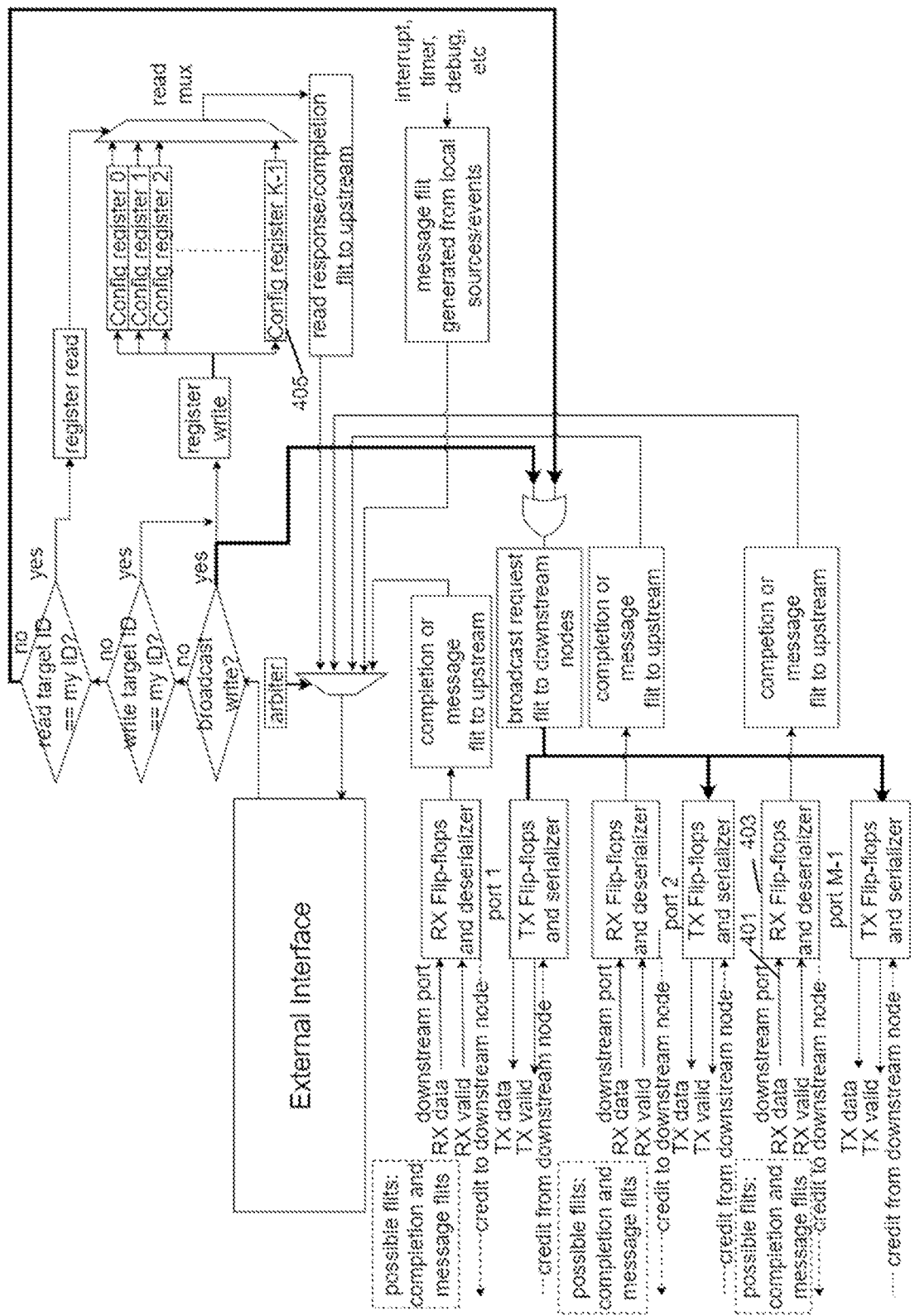
FIG. 5B is a circuit diagram showing the components of a master network element (103).

In the meantime, as shown in FIG. 5B, the master network element (103) comprises of at least one port (401) capable of being in connection with at least one port of another network element (103, 105); at least one first-in-first-out (FIFO) buffer (403) connected to said port (401) buffering data being transmitted from or received by said port (401); at least one arbiter (407) connected to said FIFO buffer (403) selecting data packets to be transmitted from said port (401); at least one configuration register (405) connected between said FIFO buffer (403) and said arbiter (407). The master network element's (103) port (401) comprises of at least one downstream port (401B) connected to the upstream port (401A) of neighbouring basic network element (105). The configuration of said port (401) can be dynamically assigned.

Each CBUS network element (201) has a set of configuration registers. The register definition is implementation specific. The configuration register (405) in said basic network element (105) or master network element (103) is capable of configuring said NOC's basic element's routing table, quality-of-services (QoS) arbitration weights, enabling or disabling channels in said NOC (107) or combination thereof. The configuration registers can also be connected to exception events/interrupts or debug messages from the main NOC.

Figure 2:
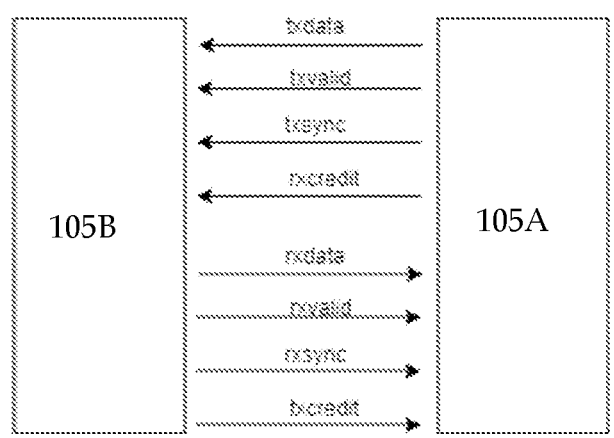
FIG. 2 is a block diagram showing the interface between two neighbouring CBUS elements.

As shown in FIG. 2, the interface between a first basic network element (105A) and a second basic network element (105B), whereby said first basic network element and second basic network element are neighbouring basic network elements, comprises of: a transmit data channel (txdata) from said first basic network element (105A) to said second basic network element (105B); a transmit valid channel (txvalid) from said first basic network element (105A) to said second basic network element (105B); a transmit synchronization channel (txsync) from said first basic network element (105A) to said second basic network element (105B); a receive credit channel (rxcredit) from said first basic network element (105A) to said second basic network element (105B); a receive data channel (rxdata) from said second basic network element (105B) to said first basic network element (105A); a receive valid channel (rxvalid) from said second basic network element (105B) to said first basic network element (105A); a receive synchronization channel (rxsync) from said second basic network element (105B) to said first basic network element (105A); a transmit credit channel (txcredit) from said second basic network element (105B) to said first basic network element (105A).

Meanwhile, the interface between said master network element (103) and a neighbouring basic network element (105B), comprises of: a transmit data channel (txdata) from said master network element (103) to said second basic network element (105B); a transmit valid channel (txvalid) from said master network element (103) to said second basic network element (105B); a transmit synchronization channel (txsync) from said master network element (103) to said second basic network element (105B); a receive credit channel (rxcredit) from said master network element (103) to said second basic network element (105B); a receive data channel (rxdata) from said second basic network element (105B) to said master network element (103); a receive valid channel (rxvalid) from said second basic network element (105B) to said master network element (103); a receive synchronization channel (rxsync) from said second basic network element (105B) to said master network element (103); a transmit credit channel (txcredit) from said second basic network element (105B) to said master network element (103).

It is the advantage of the present invention that the transmit data channel (txdata) and said receive data channel (rxdata) transmits serial data of 1-bit. The information that flows between the CBUS elements (201) are packetized and serialized as 1-bit data. Only four wires are needed for each direction between 2 CBUS elements, as shown in FIG. 2. It should also be noted that other embodiments might include serial data of arbitrary number of bits, such as 2 bits, 3 bits, 4 bits, etc.

Figure 3A:
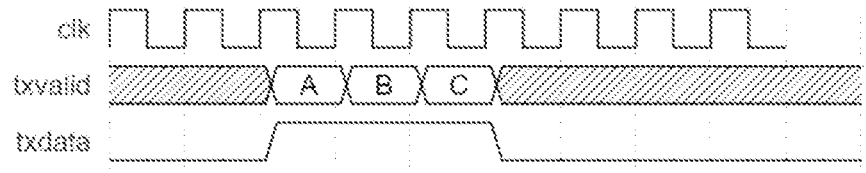
FIG. 3A is a waveform showing the relationship between 'valid' and 'data' pair.
Figure 3B:
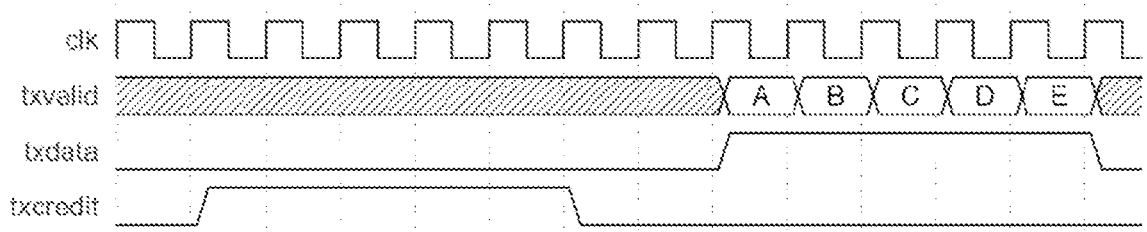
FIG. 3B is a waveform showing

The waveform as shown in FIG. 3A shows the relationship between 'valid' and 'data' pair (e.g., txvalid with txdata, or rxvalid with rxdata). When 'valid' is 1, it indicates that the 'data' is valid. When 'valid' is 0, the 'data' can be ignored. As shown in FIG. 3B, the 'credit' signals are used to indicate to the opposite CBUS element the amount of storage available. For example, if the second CBUS element (201B) asserts the txcredit for 5 cycles to the first CBUS element (201A), it indicates to the first CBUS network element (201A) that there are 5 empty bit storage in the second CBUS element (201B). The first CBUS element (201A) can at most send 5 bits of 'data' (with 'valid'=1) to the second CBUS element (201B).

Figure 4A:
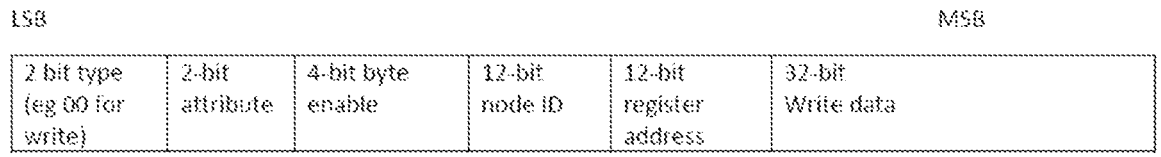
Figure 4B:
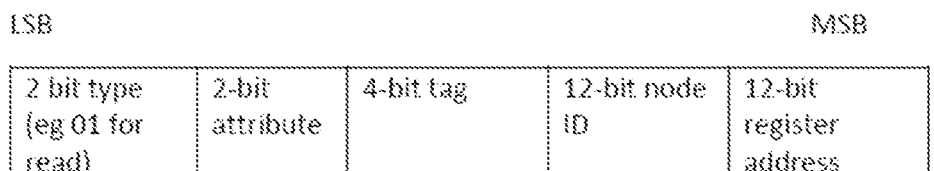
Figure 4C:
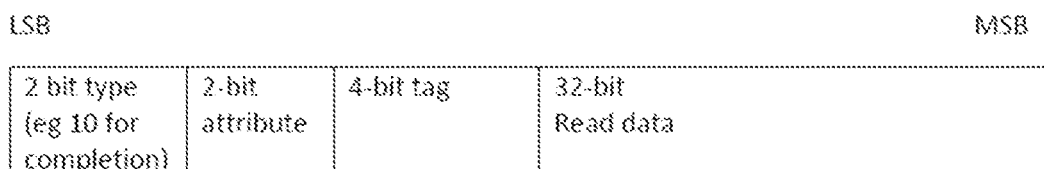
FIG. 4C is a diagram of an example of the read completion data packet and FIG. 4D is a diagram of an example of the message data packet.
Figure 4D:
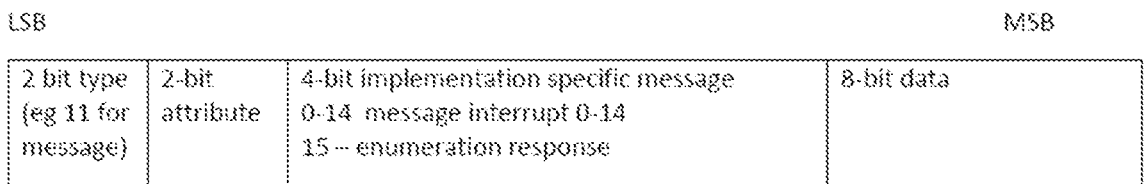

The transmit data channel (txdata) and said receive data channel (rxdata) are capable of transmitting or receiving data packets for write request, read request, read completion, message or combination thereof. Each type of packet has a fixed size and examples of said data packets are described in FIGS. 4A, 4B, 4C and 4D; whereby FIG. 4A shows an example of a write request data packet of 64-bit, FIG. 4B shows an example of a read request packet of 32-bit, FIG. 4C shows an example of a read completion data packet of 40-bit and FIG. 4D shows an example of a message data packet of 16-bit. One of the 2-bit attribute is used to indicate if the packet is a broadcast packet. Different packet fields, swapping of the order of the fields or additional fields can be implemented to the data packets as appropriate.

Here is explained some of the characteristics of the data packets transmitted between CBUS elements. Each CBUS element implements a set of configuration registers, or conversion from read/write packet that it received to read/write signals to trigger events external to the CBUS element. For example, a CBUS element can assert or de-assert a specific signal to a main NOC node/router if it receives a write packet to a specific address. In addition to that, the CBUS master network element can only send a read or write request packet downstream to the CBUS basic network element. Only the basic network elements (105) can send a message or read completion packet. Read or write request packets always go downstream, i.e. in the direction from master network element to the basic network elements. Write request data packets can be a broadcast write or a targeted write. Read request packets are always targeted. When a basic network element (105) receives a read or write request packets at its upstream port, it will always transmit it to all its downstream ports. In this manner, a read or write request packet will always reach the targeted basic network element without any routing information. Message or read completion packets always go upstream, i.e. in the direction from the basic network elements to the master network element. Read completion packets are always passed along to the upstream port by the basic network element. In such manner, the read completion packets will always arrive at the master network element. Message packets may or may not be passed along to the upstream port by the basic network element. Most of the message packets will arrive at the master network element, except for specific message packets which are implementation-specific.

As shown in FIG. 5A and FIG. 5B, it is shown that the CBUS element (201) has M ports, i.e., Port-0 to Port-(M-1). Port-0 is upstream port (i.e., facing the direction of the master network element), while Port-1 to Port-(M-1) are downstream ports. The assignment of upstream and downstream port is dynamic (not static or fixed). The assignment is done through a flow called 'Dynamic Discovery and Stubbing'.

Only read and write request packets are expected to arrive at the Upstream port RX FIFO. The CBUS element checks for the following requests. It checks that if the request is a broadcast write, it will perform the write on its own set of configuration register, and at the same time it will send the same write request packet to all its downstream ports' TX FIFO. If the request is a targeted write, it checks if the write request's node ID is same as this CBUS element's node ID, whereby if it is, then it will perform the write on its own set of configuration register. If the request is a targeted read, it checks if the read request's node ID is the same as this CBUS element's node ID, whereby if it is, then it will perform a read on its own set of configuration register, and then enqueue a read completion packet to be sent back to the upstream Port's TX FIFO. It also checks anything else will be passed along by transmitting to all its downstream ports' TX FIFO.

Only read-completion and message packets are expected to arrive at the Downstream ports RX FIFO. The basic network element always passes along read-completion packets to the Upstream port's TX FIFO. Message packets are handled the same way except for implementation specific reasons (for example if the message is part of a power-management handshake between a downstream basic network and its upstream basic network element).

Furthermore, the local network element can be listening for local triggers such as interrupts, exceptions, timer events, debug monitoring, etc which will cause a message packet to be synthesized and then sent to the Upstream Port's TXFIFO.

An arbiter selects (based on round robin, weighted round robin or priority-based arbitration) one out of the following possible data packets simultaneously available for transmission to the Upstream Port's TX FIFO: read completion from this basic network element, read completion packets or message packets received from the downstream ports' RX FIFO or message packet synthesized from this basic network element due to local events/triggers. No arbiter is required for transmitting to the downstream ports' TX FIFO because the only possible source is from the Upstream Port, and only 1 data packet is received at a time at most.

Figure 6A:
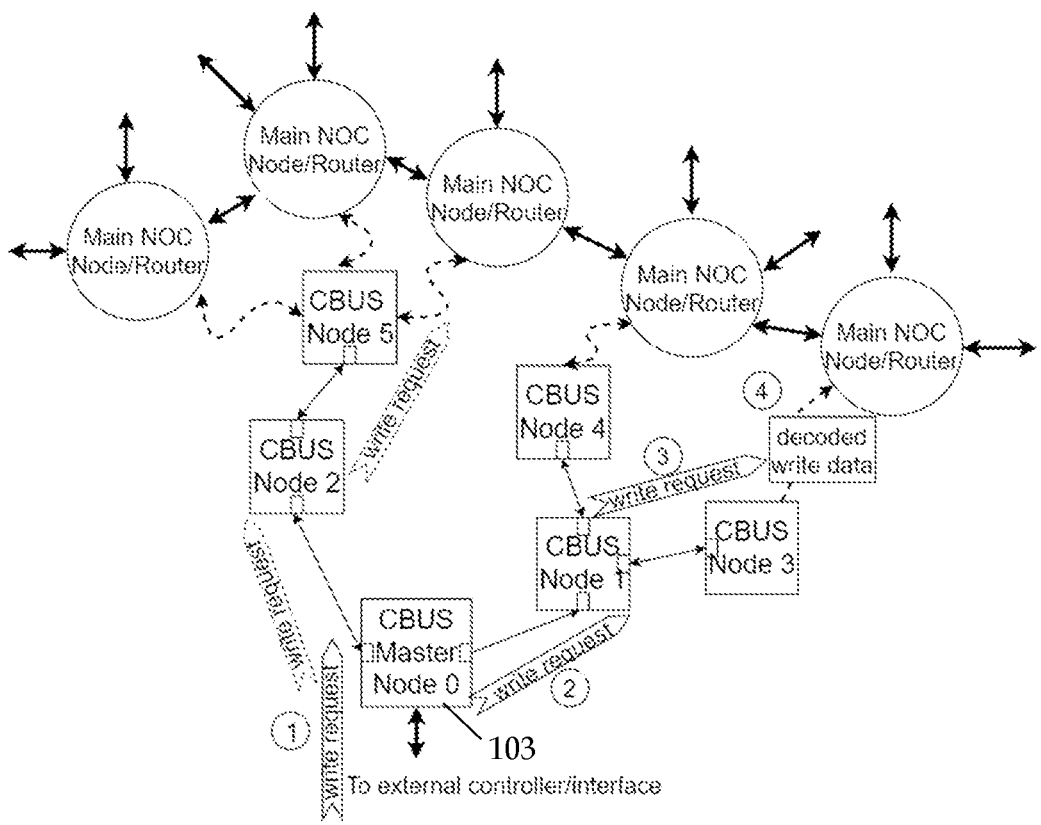

FIG. 6A shows an example of a targeted write request packet sent from the master network element (103) (referred to in the example as CBUS master node) to a basic network element (105) (in this example, referred to as CBUS Node-3). Write request will be broadcasted to all CBUS nodes. CBUS node will only perform the write on its own set of configuration register if write request's node ID is same as this CBUS node's ID.

Figure 6B:
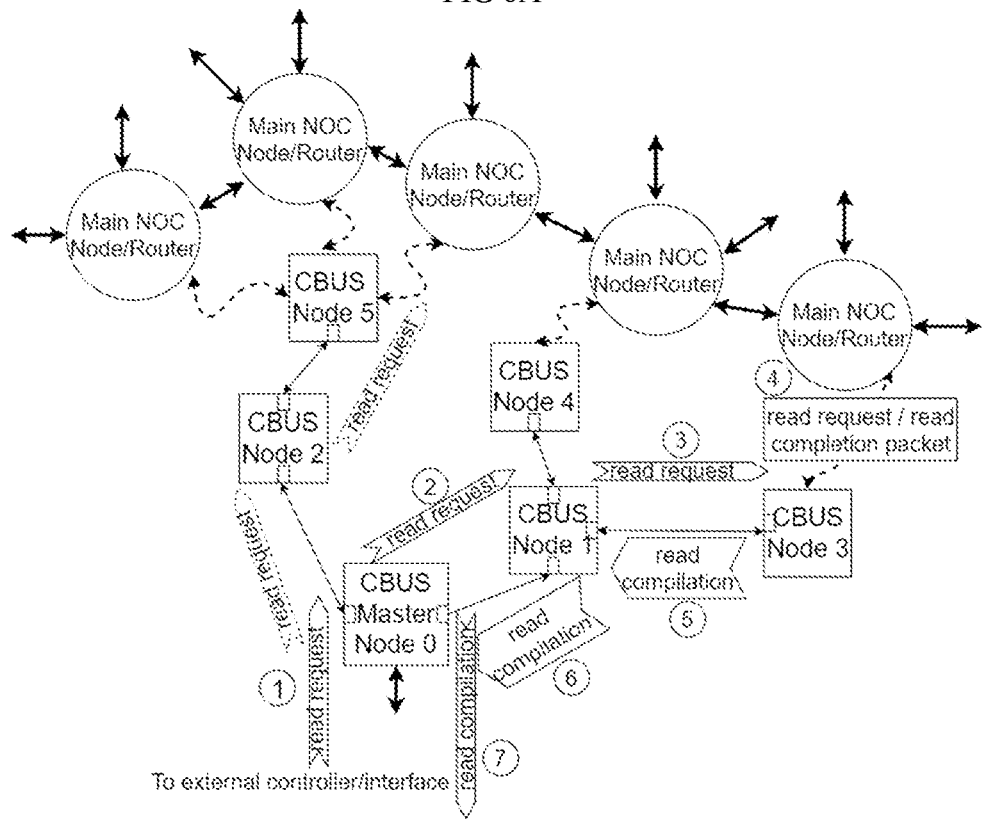
FIG. 6B is a block diagram showing an example of a targeted read request packet sent from the master network element to basic network element 3.

FIG. 6B, shows an example of a targeted read request packet sent from the master network element/CBUS Master Node to basic network element 3/CBUS Node-3. Read request will be broadcasted to all CBUS nodes. A CBUS node will only perform the read on its own set of configuration register if read request's node ID is same as this CBUS node's ID. Here in this example, CBUS Node-3 compared the read request's node ID field to its own node ID. It is a match, and thus it performs the read on its local registers, and then return the read data to the CBUS Master Node in read completion packet. The read completion packet is guaranteed to route back to the CBUS Master node by passing it along the Upstream Ports in each CBUS Node.

The secondary network (101) further comprises of at least one mailbox register connecting at least one said basic network element (105) with said clock synchronization mechanism (1205A, 1205B).

The present invention is also a method of transferring configuration, management, debug information and asynchronous events between at least one network-on-chip (NOC) (107) and external interface (109), as shown in FIG. 2, comprising the following steps. In step (i), at least one second configuration bus (CBUS) (201B) network element of at least one secondary network (101) sending transmit credit signal of '1' through at least one transmit credit channel (txcredit) to at least one first CBUS network element (201A) in clock cycle equivalent to amount of bit storage available in said second CBUS network element (201B) for said first CBUS network element (201A) to send data. In step (ii), said first CBUS network element (201A) transferring data through at least one transmit data channel (txdata) to said second CBUS network element (201B). In step (iii), if said data transferred through said transmit data channel (txdata) from said first CBUS network element (201A) to said second CBUS network element (201B) when said first CBUS network element (201A) transmitting transmit valid signal of '1' through at least one transmit valid channel (txvalid) to said second CBUS network element (201B), said second CBUS network element (201B) accepting said data as valid.

Steps (i) to (iii) are also done for communication in the opposite direction, whereby said first CBUS network element (201A) sending transmit credit signal of '1' through at least one receive credit channel (rxcredit) to said second CBUS network element (201A), said second CBUS network element (201B) transferring data through at least one receive data channel (rxdata) to said first CBUS network element (201A), and if said data transferred through said receive data channel (rxdata) from said second CBUS network element (201B) to said first CBUS network element (201A) when said second CBUS network element (201B) transmitting receive valid signal of '1' through at least one receive valid channel (rxvalid) to said first CBUS network element (201A), said first CBUS network element (201A) accepting said data as valid.

In a CBUS network, it is often desirable to have a CBUS clock tree that does not need to be balanced. This means that an implementation of the CBUS network can be greatly simplified (power/area saved) if the CBUS network itself supports a non-balanced clock. This can be achieved by adding source-synchronous or asynchronous clocking to the CBUS network.

Figure 17:
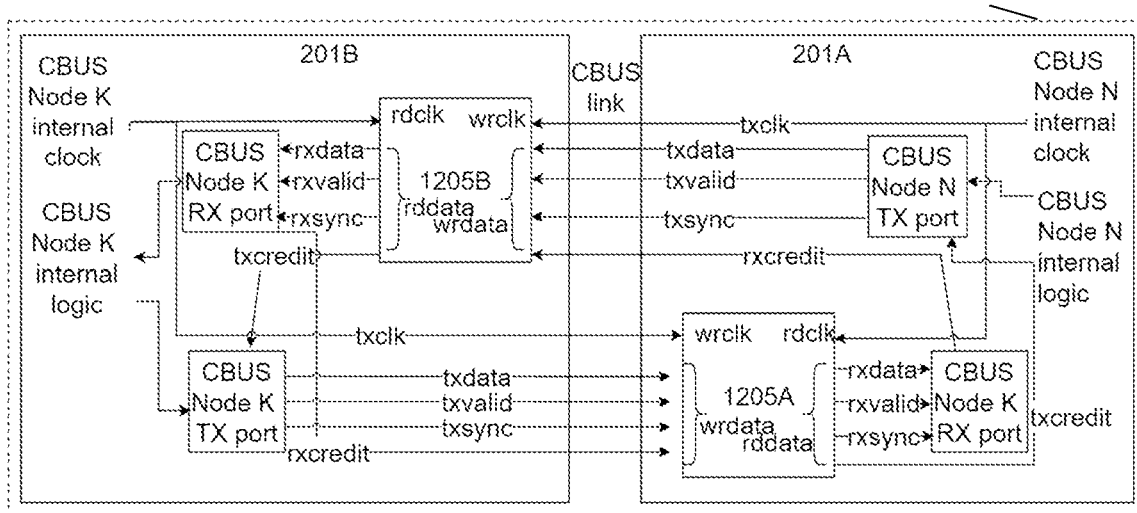
FIG. 17 is a block diagram showing implementation of a clock synchronization mechanism inside each CBUS network element for asynchronized clocking between two CBUS network elements in one secondary network.

Besides the usual 4-bit CBUS signals (data, valid, sync, credit), the internal clock is also sent and used by a first basic network element (105A) to the second basic network element (105B) as the txclk. In FIG. 17, the first basic network element (105A) sends out txvalid, txdata, txsync and rxcredit to the neighbouring second basic network element (105B), together with its own clock, txclk. The second basic network element (105B) will use this txclk to sample the txdata/txvalid/txsync/rxcredit into an Async FIFO. Internally, the second basic network element (105B) will read out/unload from the Async FIFO using its own internal clock. When sending CBUS signals across to the first basic network element (105A), it also sends out its own clock as txclk. At the first basic network element (105A), using a similar Async FIFO, the incoming signals from the second basic network element (105B) are stored, and later read out/unloaded using the first basic network element's (105A) internal clock. The benefit of this scheme that the 2 clocks of second basic network element (105B) and first basic network element (105A), do not need to be of the same frequency or phase. Each basic network element (105A, 105B) can run on an independent clock if required.

The secondary network (101) of the present invention therefore further comprises of at least one first clock synchronization mechanism (1205A) inside first CBUS network element (201A) and at least one second clock synchronization mechanism (1205B) inside second CBUS network element (201B) for asynchronized clocking between two CBUS network elements (201A, 201B) in one secondary network (101), as shown in FIG. 17. As shown in FIG. 17, the transmit credit channel (txcredit), transmit data channel (txdata), transmit valid channel (txvalid), receive credit channel (rxcredit), receive data channel (rxdata) and receive valid channel (rxvalid) between said two CBUS network elements (201A, 201B) in the same secondary network (101) is buffered by at least one clock synchronization mechanism (1205A, 1205B), wherein said clock synchronization mechanism (1205A, 1205B) further comprises of a clock channel (txclk) synching signals for said transmit credit channel (txcredit), transmit data channel (txdata), transmit valid channel (txvalid), receive credit channel (rxcredit), receive data channel (rxdata) and receive valid channel (rxvalid) to the local clock. The clock synchronization mechanism (1205A, 1205B) can be asynchronous first-in-first-out (FIFO) buffer. The CBUS network element (201A, 201B) can be master network element (103) or basic network element (105).

Figure 12A:
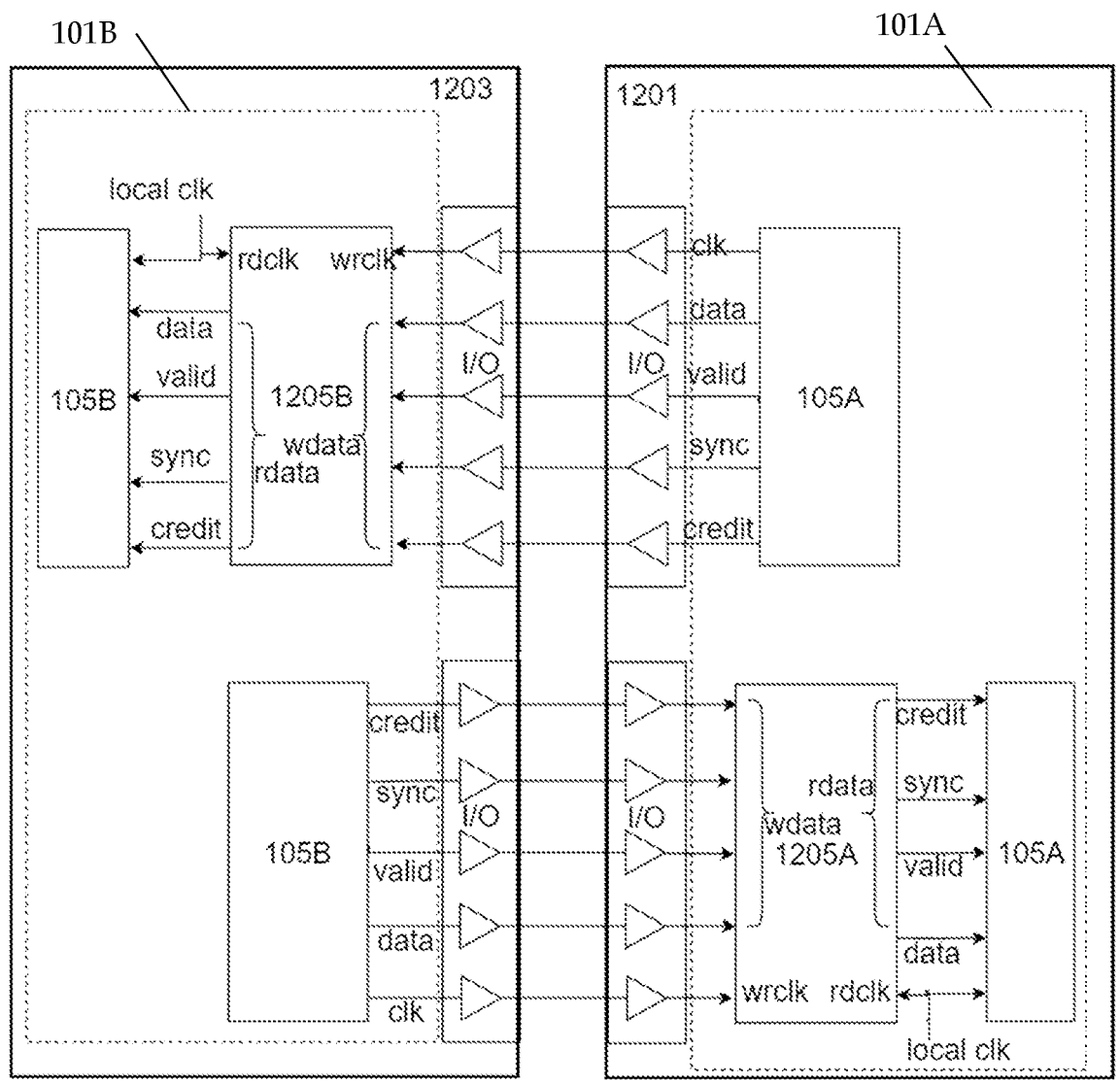

There are several methods to transmit CBUS data packets across multiple chiplets or ICs. One of the methods is the direct input-output (I/O) method. The CBUS interconnect between two basic network elements can be easily buffered. FIG. 12A shows an example of the usage of I/O buffers to send CBUS signals across multiple chiplets. The example below shows the minimum number of signals required to be sent from the first basic network element (105A) in a first secondary network (101A) to the second basic network element (105B) in a second secondary network (101B), namely, clock, data, valid, credit and sync. Also shown in FIG. 12A is the reverse direction from the second basic network element (105B) to the first basic network element (105A), which is exactly same albeit with the directions reversed. Typical clock synchronization methods such as asynchronous FIFO can be used on each side to synchronize the received CBUS signals to the local clock domain.

In view of the above, the secondary network (101) of the present invention further comprises of at least one first clock synchronization mechanism (1205A) which can be inside the first secondary network (101A) while at least one second clock synchronization mechanism (1205B) inside the second secondary network (101B), for transmission of data across multiple integrated circuits (ICs) (1201, 1203), as shown in FIG. 12A. The clock synchronization mechanism can be asynchronous first-in-first-out (FIFO) buffer or any other suitable clock synchronization mechanism.

As shown in FIG. 12A, the transmit credit channel (txcredit), transmit data channel (txdata), transmit valid channel (txvalid), receive credit channel (rxcredit), receive data channel (rxdata) and receive valid channel (rxvalid) between said two CBUS network element (201) across multiple integrated circuits (ICs) (1201, 1203) is buffered by at least one clock synchronization mechanism (1205A, 1205B), wherein said clock synchronization mechanism (1205A, 1205B) further comprises of a clock channel (txclk) synching signals for said transmit credit channel (txcredit), transmit data channel (txdata), transmit valid channel (txvalid), receive credit channel (rxcredit), receive data channel (rxdata) and receive valid channel (rxvalid) to the local clock.

Figure 12B:
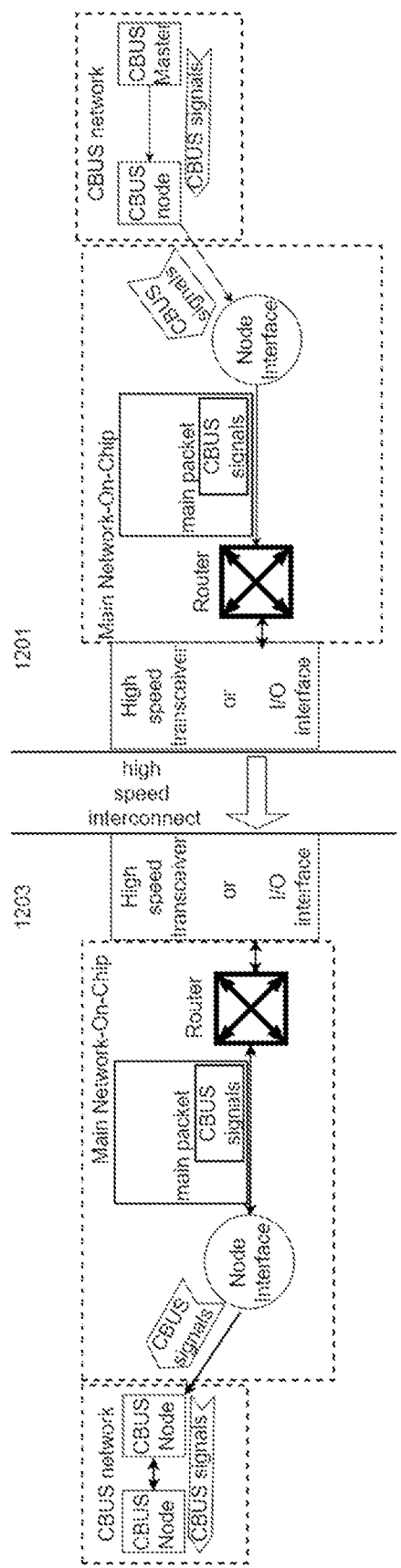
FIG. 12B is a block diagram showing an example of using one portion of the NOC to send CBUS signals across multiple chiplets.

As shown in FIG. 12B, the transmit credit channel (txcredit), transmit data channel (txdata), transmit valid channel (txvalid), receive credit channel (rxcredit), receive data channel (rxdata) and receive valid channel (rxvalid) between said two CBUS network element (201) across multiple integrated circuits (ICs) (1201, 1203) can also be buffered by at least one portion of the NOC (107), wherein signals for said transmit credit channel (txcredit), transmit data channel (txdata), transmit valid channel (txvalid), receive credit channel (rxcredit), receive data channel (rxdata) and receive valid channel (rxvalid) are encapsulated into at least one data packet transferred between multiple NOC elements (111). The CBUS signals (data, valid, credit and sync) are encapsulated by packing it as a payload to be inserted as part of the main Network-on-chip (NOC) packet. The main NOC packet traverses the main NOC's Node Interface and to the last Router before being sent across the high-speed interconnect to the next chiplet. At the other end, the main NOC packet traverses from the Router to the Node Interface. The payload is extracted out from the main NOC packet, and unpacked into the individual CBUS signals.

The CBUS network element (201A, 201B) can convert said read request data packet or write request data packet to read signal or write signal respectively to trigger specific event external to said CBUS network element (201A, 201B). The conversion can be done using at least one configuration register.

The write request data packet or read request data packet is transmitted by said downstream port (401B). Upon said basic network element (105) receiving said read request data packet or write request data packet, said basic network element (105) transmitting said read request data packet or write request data packet through said downstream port (401B) to at least one neighbouring basic network element (105). The write request data packet is broadcast write or targeted write.

The read completion data packet is transmitted by said upstream port (401A). Upon said basic network element (105) receiving said read completion data packet, said basic network element (105) transmitting read completion data packet through said upstream port (401A) to neighbouring basic network element (105) until reaching said master network element (103). The read request data packet is targeted read.

The assignment and stubbing of ports (401) in said CBUS network element is automatic. In the first embodiment, the assignment and stubbing of said port (401) is done using the following steps. In step (i), said master network element (103) transmitting transmit 'sync' signal through at least one transmit sync channel (txsync) to said port (401) of all neighbouring basic network elements (105). In Step (ii), port (401) of said basic network elements (105) which receives said transmit 'sync' signal is assigned as upstream port (401A) while other ports (401) of said basic network elements (105) that do not receive said transmit 'sync' signal is assigned as downstream port (401B); wherein if a plurality of ports (401) in one basic network element (105) receiving said transmit 'sync' signal, one of said plurality of ports (401) is assigned, based on predetermined criteria, as upstream port (401A) while other unchosen ports among said plurality of ports are assigned as stubbed port (401C). In step (iii), upon said port (401) being assigned as upstream port (401A), said basic network element (105) transmitting receive 'sync' signal through at least one receive sync channel (rxsync) back to the CBUS network element (201) that sent said transmit 'sync' signal; while said basic network element (105) transmitting transmit 'sync' signal through at least one transmit sync channel (txsync) to ports (401) of all other neighbouring basic network elements (105); while said stubbed port (401C) does not transmit receive 'sync' signal; wherein upstream port (401A) of neighbouring CBUS network element (201) which is supposed to receive said receive 'sync' signal from port (401) being assigned as stubbed ports (401C) is assigned as stubbed port (401C); wherein steps (ii) and (iii) are repeated until all ports in said CBUS elements (201) are assigned and stubbed.

Figure 7A:
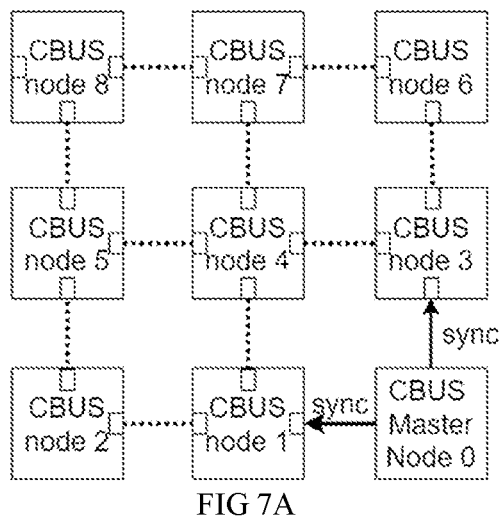
FIG. 7A to 7E are block diagrams showing an example of the implementation of the dynamic discovery/assignment and stubbing of the present invention.

An example of the implementation of the first embodiment of the method of performing dynamic discovery/assignment and stubbing is as shown in FIG. 7A to 7E. Assume that there is a secondary network (101) comprising of 3×3 CBUS network elements (201) arranged in a mesh. CBUS network element (201) comprises of master network element (103) and basic network element (105) (in this example, the master network element (103) is referred to as CBUS Master Node while the basic network element (105) is referred to as CBUS Node). All CBUS network elements (201) are connected to its neighbouring CBUS network element (201). CBUS Master Node is Node 0 and is the bottom-right node. The CBUS Master Node can send read/write requests to all other Nodes. Firstly, after reset, all CBUS network elements' ports are neutral, i.e., they have not yet been assigned as Upstream or Downstream port. To the CBUS Master Node, all ports are downstream ports (no upstream port for CBUS Master Node). As shown in FIG. 7A, the CBUS Master Node asserts a single-wire 'sync' signal to all its downstream ports. Here, CBUS Node-3 and CBUS Node-1, being the immediate neighbours of CBUS Master Node, see the 'sync' signal from CBUS Master Node.

Figure 7B:
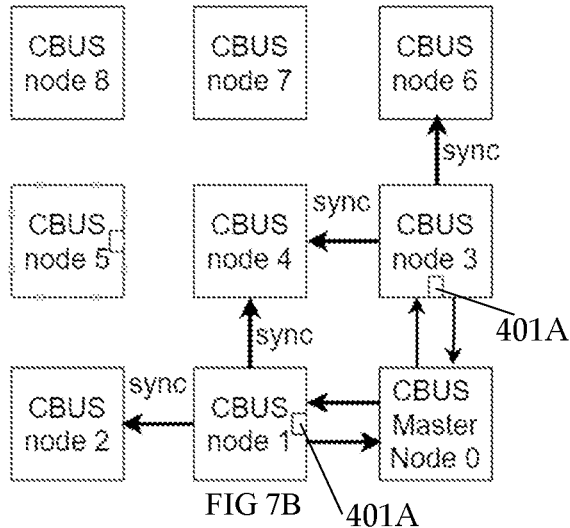

The port where the CBUS Node receives the 'sync' signal will be assigned as Upstream Port (401A). All other ports of the CBUS Node are then assigned as Downstream Ports (401B). The CBUS Node will return the 'sync' signal to its Upstream Port, and at the same time, send the 'sync' signal on all its Downstream Ports. As shown in FIG. 7B, CBUS Node-1 assigns its right port as Upstream Port (401A) because it received the 'sync' signal at that port. It assigns the top and left ports as Downstream Ports, and then it sends out 'sync' signal on all ports. CBUS Node-3 assigns its bottom port as Upstream Port (401A) because it received the 'sync' signal at that port. It assigns its top and left ports as Downstream Ports, and then it sends out 'sync' signal on all ports.

Figure 7C:
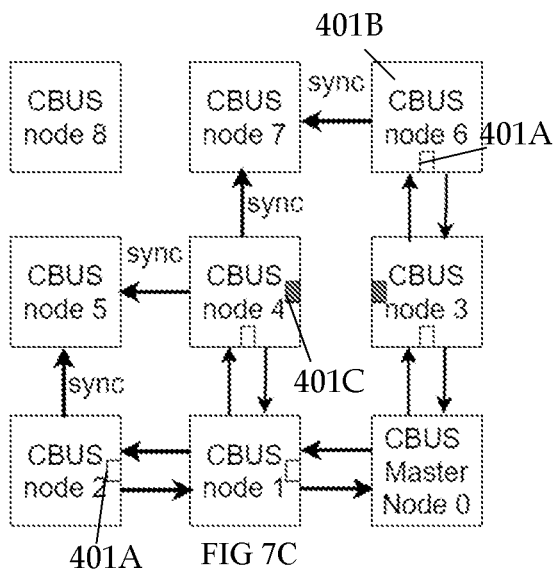

Next, as shown in FIG. 7C, CBUS Node-2 receives the 'sync' signal from CBUS Node-1 on its right port, and so it assigns the right port as Upstream Port (401A), and the top port as Downstream Port. It also sends out 'sync' signal on all ports. Similarly, CBUS Node-6 receives the 'sync' signal from CBUS Node-3 on its bottom port, and so it assigns the bottom port as Upstream Port (401A) and the left port as Downstream Port (401B). It also sends out 'sync' signal on all ports. CBUS Node-4 receives the 'sync' signal from both CBUS Node-1 and CBUS Node-3. It can only choose one as Upstream Port, so it assigns the bottom port as the Upstream Port (in implementation, this can be done using a priority encode in the order of bottom, right, top, left where bottom port gets the highest priority), and the other ports as the Downstream Ports. At the same time, it stubs or disables the right port, to become stubbed port (401C), because it only has an Upstream Port. Once a port is stubbed, the 'sync' signal will not be sent out on that port. This method of dynamically disabling a port during network discovery is called as Dynamic Stubbing. In CBUS Node-3, it sends out the 'sync' signal on its Downstream left port but it does not receive any reciprocal 'sync' signal back from that port, so after a predetermined timeout, it will also stub/disable its left port, and stops sending 'sync' signal on the left port.

Figure 7D:
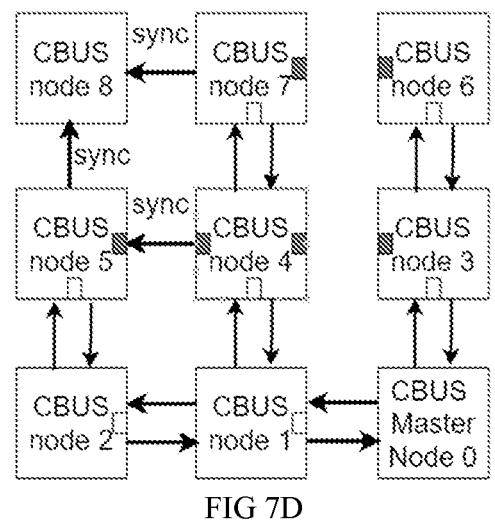

Next, as shown in FIG. 7D, CBUS Node-5 receives the 'sync' signal on both the bottom and right port. It chooses the bottom port as the Upstream port and it disables/stubs the right port. 'sync' signal is only sent back on the bottom port but not on the disabled right port. CBUS Node-4 will timeout on its left port when it does not receive the reciprocal 'sync' signal from CBUS Node-5. CBUS Node-7 also receives the 'sync' signal on both the bottom and right port. It chooses the bottom port as the Upstream Port and it disables/stubs the right port. 'sync' signal is only sent back on the bottom port but not on the disabled right port. CBUS Node-6 will timeout on its left port when it does not receive the reciprocal 'sync' signal from CBUS Node-7. See diagram below.

Figure 7E:
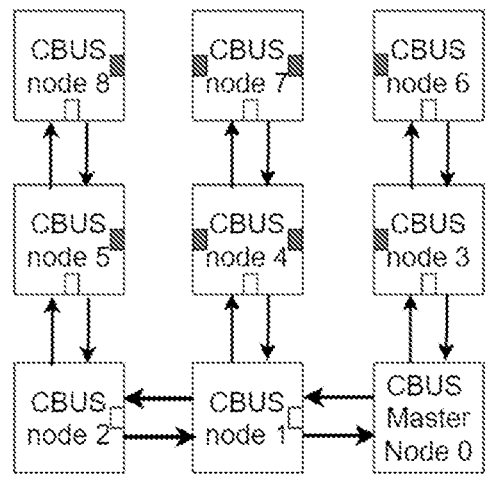

Finally, as shown in FIG. 7E, CBUS Node-8 receives the 'sync' signal on both the bottom and right port. It chooses the bottom port as the Upstream port and it disables/stubs the right port. 'sync' signal is only sent back on the bottom port but not on the disabled right port. CBUS Node-7 will timeout on its left port where it did not receive any reciprocal 'sync' signal from CBUS Node-8, and thus it disables/stubs its own left port. FIG. 7E shows the final steady state of the CBUS network. The method of the first embodiment as described earlier is more suitable for a CBUS network running off a globally balanced clock tree.

The first embodiment of the method of assignment and stubbing of the ports (401) in the basic network element (105) requires usage of the 'sync' signal. In the second embodiment of the method of assignment and stubbing of the ports (401) in the basic network element (105), an alternative method is implemented, with the usage of 'sync' signal and 'ack' signal.

In the second embodiment of the method of performing assignment and stubbing of said port (401), said method is done using the following steps. In step (i), said master network element (103) transmitting transmit 'sync' signal through a transmit sync channel (txsync) of all of its downstream port (401B) to the port (401) of all neighbouring basic network elements (105). In step (ii), port (401) of said basic network elements (105) which receives said transmit 'sync' signal is pre-assigned as upstream port (401A) while other ports (401) of said basic network elements (105) that do not receive said transmit 'sync' signal is pre-assigned as downstream port (401B); wherein if a plurality of ports (401) in one basic network element (105) receiving said transmit 'sync' signal from a plurality of upstream basic network elements, only one of said plurality of ports (401) is pre-assigned as upstream port (401A), based on predetermined criteria. In step (iii), all said downstream ports (401B) of said basic network element (105) transmitting transmit 'sync' signal through at least one transmit sync channel (txsync) to their corresponding ports (401) of other neighbouring basic network elements (105). Steps (ii) and (iii) are repeated until all ports (401) in said basic network elements (105) are pre-assigned.

The method further comprises of the steps. In step (iv), once all the ports (401) in all the basic network elements (105) are pre-assigned, the basic network element (105) which does not have any downstream port transmitting receive acknowledge signal through receive acknowledge channel (rxack) of its upstream port (401A) to its upstream basic network element (105). In step (v), upon said downstream port (401B) of upstream basic network element (105) receiving said receive acknowledge signal from said downstream basic network element (105) that are not stubbed, said basic network element (105) assigning pre-assigned upstream port (401A) as upstream port (401A), assigning ports that have transmitted and received transmit 'sync' signal as stubbed port (401C), and assigning other ports (401) as downstream ports (401B); before said basic network element (105) transmitting receive acknowledge signal to its upstream basic network element (105). Step (v) is repeated until all ports (401) of said basic network elements (105 in said secondary network (101) are assigned.

Figures 18A, 18B:
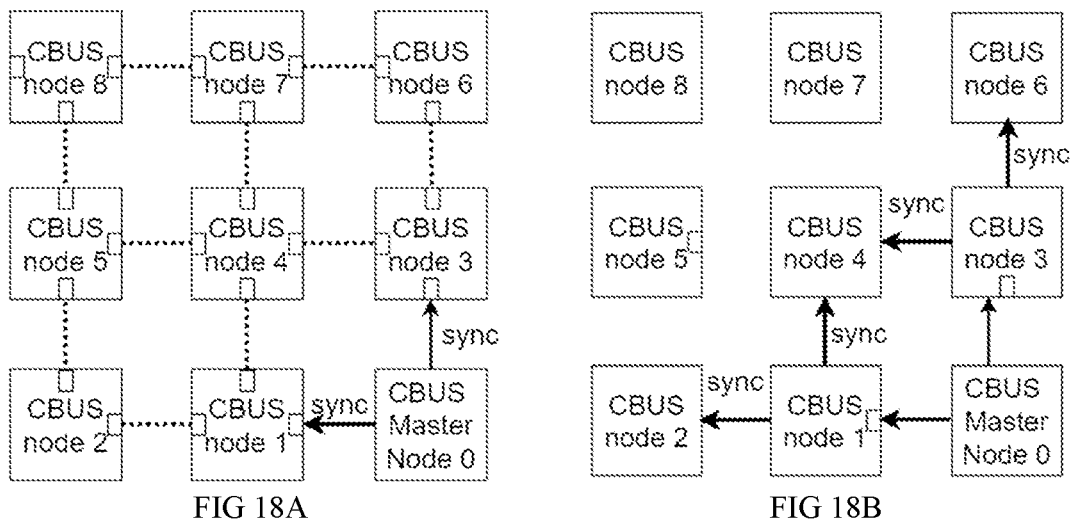
FIG. 18A to 18I are block diagrams showing implementation of an alternative method to perform network discovery using 'sync' and 'ack' handshake.

An example of the implementation of the second embodiment of the method of performing dynamic discovery/assignment and stubbing is shown in FIG. 18A to FIG. 18I. Using the same 3×3 mesh example as before, the CBUS Master starts by sending 'sync' signal to both the top and left CBUS nodes, as shown in FIG. 18A.

Figures 18C, 18D:
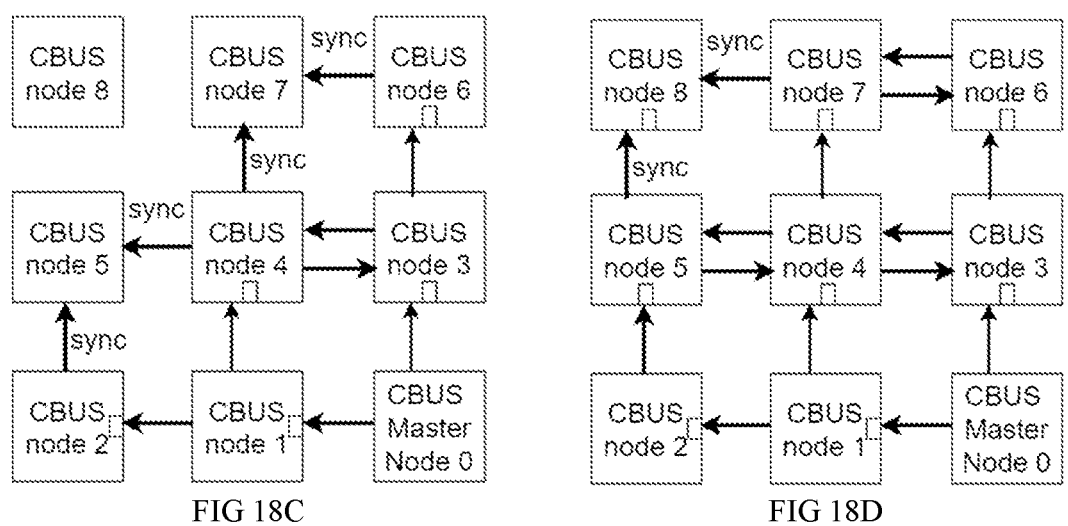

Both CBUS Node-1 and CBUS Node-3 will determine their upstream port based on the said 'sync' signal, and send 'sync' signals to all their downstream ports. As shown in FIG. 18B, at CBUS Node-4, it receives the 'sync' signal from both its bottom port (from CBUS Node-1) and its right port (from CBUS Node-3). However, in the second embodiment, CBUS Node-4 will send out 'sync' signal from all of its downstream ports, including the right port where it already receives the 'sync' signal, as shown in FIG. 18C. CBUS Node-4 will later designate the right port as the dynamic stub but for now, it still sends the 'sync' signal to CBUS Node-3. Different from the first embodiment of the method of performing assignment and stubbing of port (401), CBUS Node-2, CBUS Node-4 and CBUS Node-6 do not send the reciprocal 'sync' signal from its upstream port (i.e., CBUS Node-1 will not receive any 'sync' signal from CBUS Node-4 or CBUS Node-2).

The continues, as shown in FIG. 18D, until all CBUS Nodes have received at least a 'sync' signal from their neighbours. At the steady state, it is observed that an upstream port only receives a 'sync' signal and will not send out a 'sync' signal. It is also observed that ports that are potential stubs will receive a 'sync' signal and also send out a 'sync' signal.

Figures 18E, 18F:
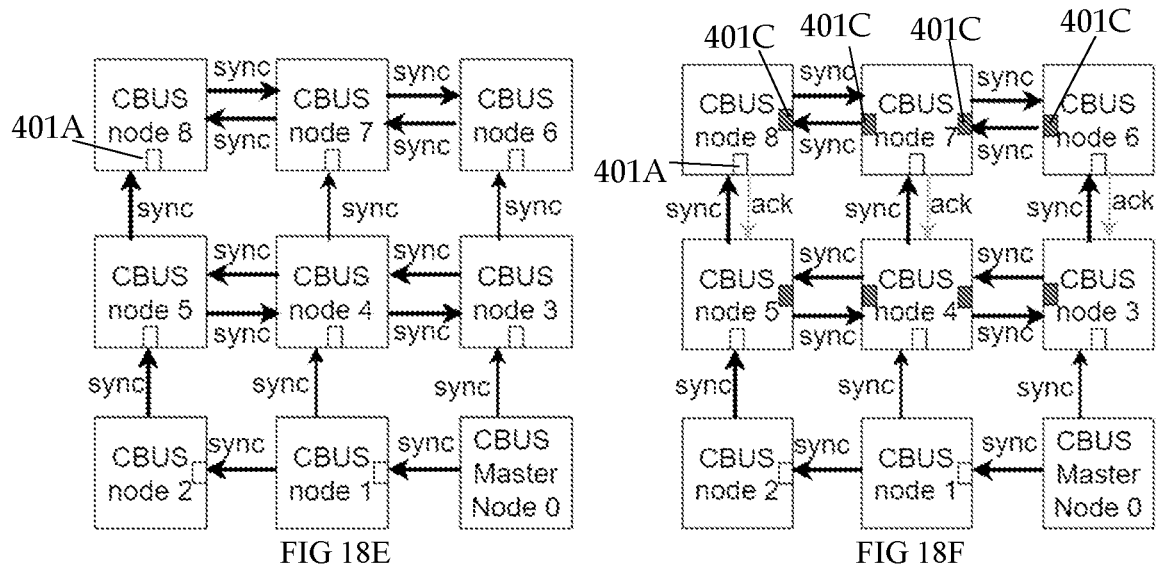

As shown in FIG. 18E, CBUS Node-6, CBUS Node-7, and CBUS Node-8 are now 'leaf' nodes, where they have one upstream port (401A), and the rest of the ports are potentially stubbed ports. For example, CBUS Node-8's bottom port is an upstream port (401A), and its right port should be stubbed because said right port sends out a 'sync' signal and also receives a 'sync' signal. On the other hand, CBUS Node-5 is not a 'leaf' node because it has a top port which sends out a 'sync' signal but does not receive any 'sync' signal. Once a CBUS Node has determined itself to be a 'leaf' node, it can now send back a new signal, called the 'ack' from its upstream port, as shown in FIG. 18F. At the same time, said 'leaf' node can stub at least one of its ports that is both sending out a 'sync' signal and receiving a 'sync' signal.

Figure 18G:
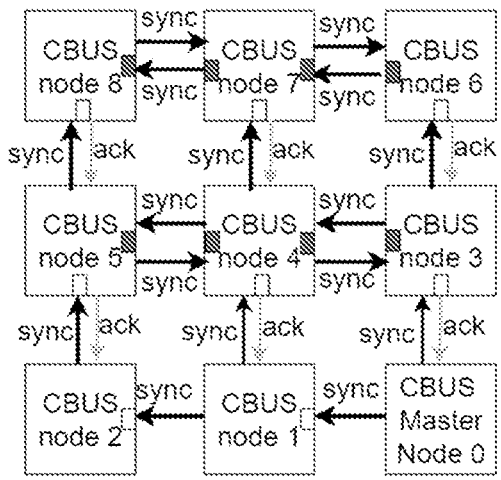

Now, as shown in FIG. 18G, CBUS Node-3, CBUS Node-4, and CBUS Node-5 receives the 'ack' signal from their downstream ports that are not stubbed. All of the ports of CBUS Node-3, CBUS Node-4 and CBUS Node-5 are pre-assigned as either stubbed port (401C), upstream port (401A), or downstream port (401B). Now they too can send their 'ack' signal from their upstream ports.

Figure 18H:
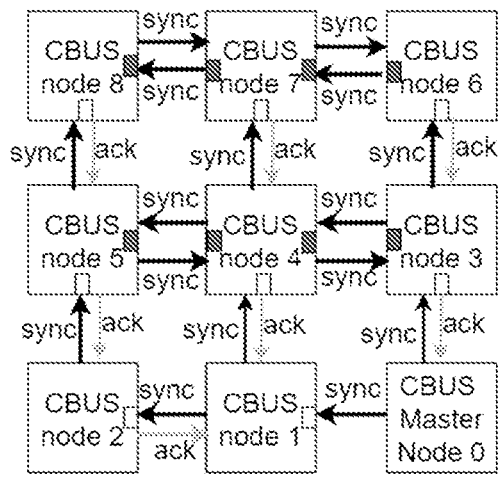
Figure 18I:
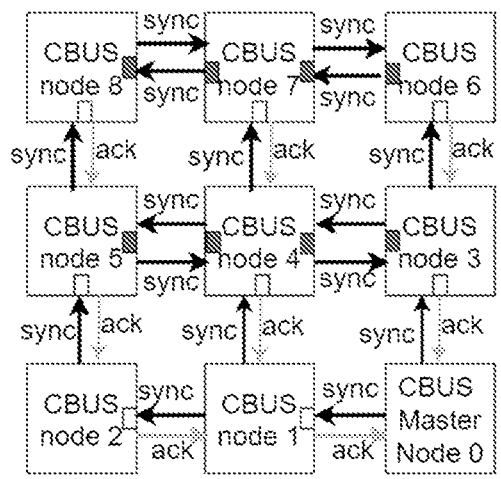

As shown in FIG. 18H, CBUS Node-2 receives the 'ack' signal and now its ports are fully pre-assigned either as upstream port (401A) or downstream port (401B). It too can now send the 'ack' signal from its upstream port. Next, as shown in FIG. 18I, CBUS Node-1 receives the 'ack' signal, and after all of its ports are fully pre-assigned as upstream port or downstream port, it too sends the 'ack' signal from its upstream port. After that, CBUS Master receives 'ack' signal on all its downstream ports. Hence, the second embodiment of dynamic network discovery and stubbing process is deemed complete.

The benefit of this method of the second embodiment of dynamic network discovery and stubbing over the first embodiment of the dynamic network discovery and stubbing is there is no timeout mechanism required. The propagation of the 'sync' signal throughout the entire CBUS network and the propagation of the 'ack' signal back to the CBUS Master is self-timed. Hence, this method is very suitable for the CBUS nodes that are running on asynchronous or source-synchronous clocks.

Figure 8A:
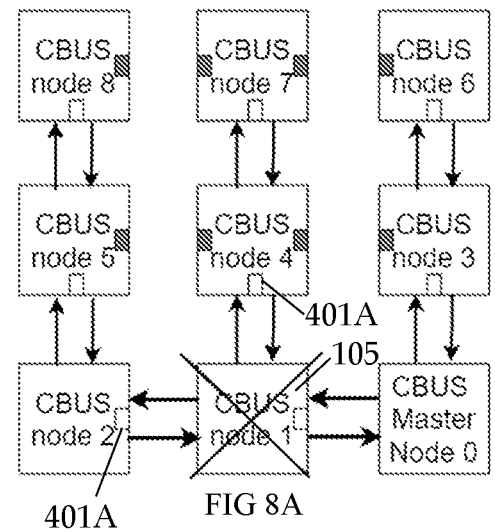
FIG. 8A to 8G and FIG. 9A to 9D are block diagrams showing the first embodiment of the implementation of network rediscovery or re-stubbing after powering down of a CBUS node.
Figure 8B:
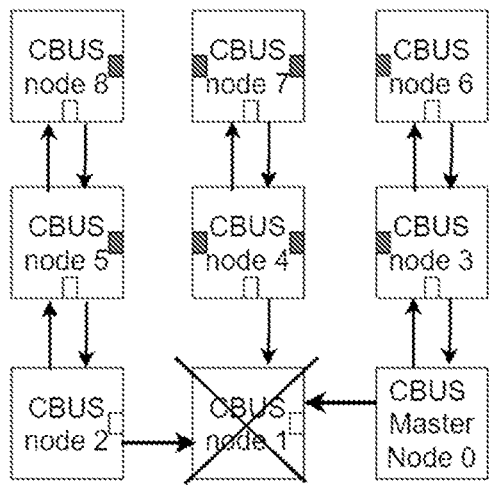
Figure 8C:
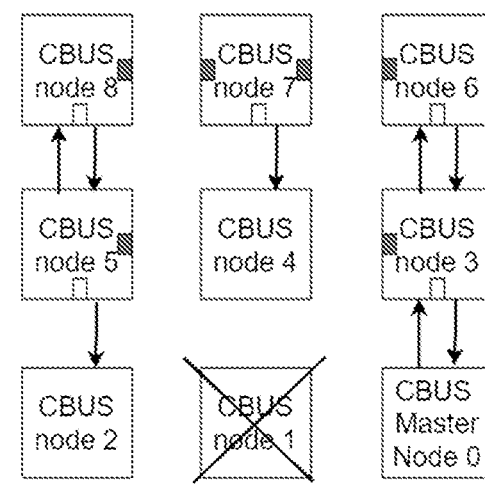

The steady state of the CBUS network is broken when one of the CBUS nodes are brought down either for power gating or for some reasons. The following, as shown in FIG. 8A to 8G and FIG. 9A to 9D, explains the first embodiment of the method of performing network re-discovery and re-stubbing after said CBUS network elements (201) are brought down. In the following example, it is assumed that CBUS Node-1, as one of the basic network elements (105), is brought down, as shown in FIG. 8A. CBUS Node-2 and CBUS Node-4 will then lose the 'sync' signal on their respective Upstream Ports (401A), as shown in FIG. 8B. When sync is lost, the CBUS Node's ports return to the non-assigned or neutral state, as shown in FIG. 8C. Since a port became neutral, the port will also stop sending out 'sync' signal. All of CBUS Node-2 and CBUS Node-4's ports returned to the neutral state when they lose their sync which was previously sent by CBUS Node-1.

Figure 8D:
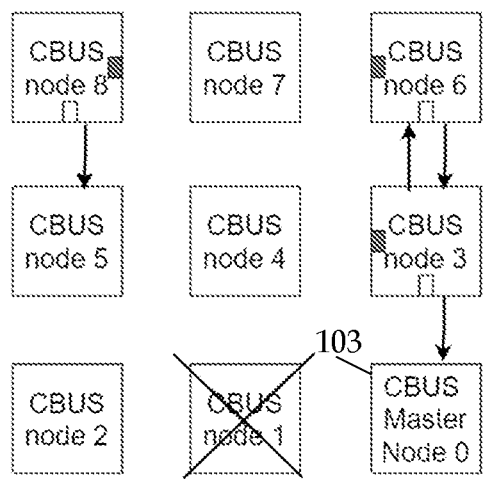

As shown in FIG. 8D, CBUS Node-5 and CBUS Node-7 now lose the 'sync' signal on their Upstream Port, and set all their ports to neutral state. At the same time, the master network element (103) (referred to in this example as CBUS Master Node) also loses the reciprocal 'sync' signal from CBUS Node-1 on its Downstream left port. In this case, the CBUS Master Node itself experienced the sync-lost event directly. The CBUS Master Node is made aware an interconnect disruption somewhere in the CBUS network. To recover, the CBUS Master Node stops sending the 'sync' signal to all Downstream ports in an attempt to re-initialize the CBUS network.

Figure 8E:
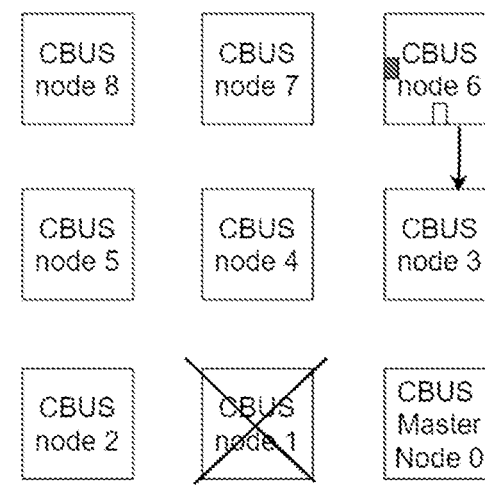

As shown in FIG. 8E, CBUS Node-8 and CBUS Node-3 now lost the 'sync' signal on their respective Upstream Ports, and they would reset their ports back to the neutral state.

Figure 8F:
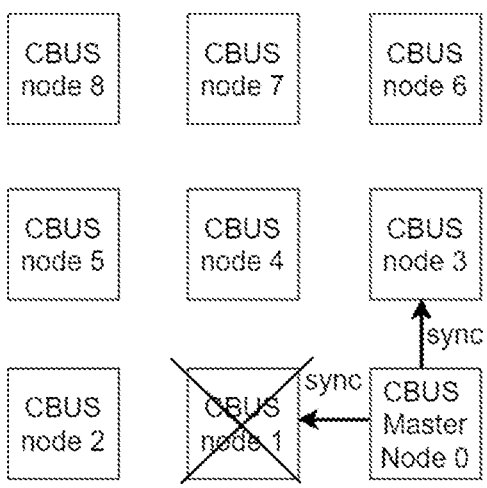

As shown in FIG. 8F, CBUS Node-6 now also lost its 'sync' signal from CBUS Node-3, and it also reset all its ports to the neutral state. At this stage, all CBUS Nodes are back to the neutral state. After a losing reciprocal 'sync' signal on all its Downstream Ports, the CBUS Master Node now starts sending out 'sync' signal again on all its Downstream Ports. This includes sending out 'sync' signal on the left port to CBUS Node-1. However, since CBUS Node-1 is disabled, it will not send back the reciprocal 'sync' signal and thus CBUS Master Node will stub/disable its own left port.

Figure 8G:
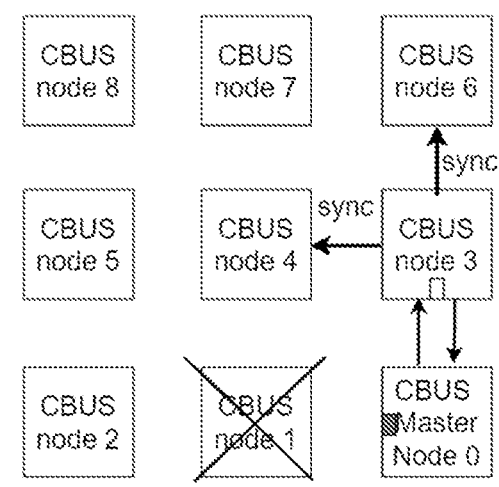
Figure 9A:
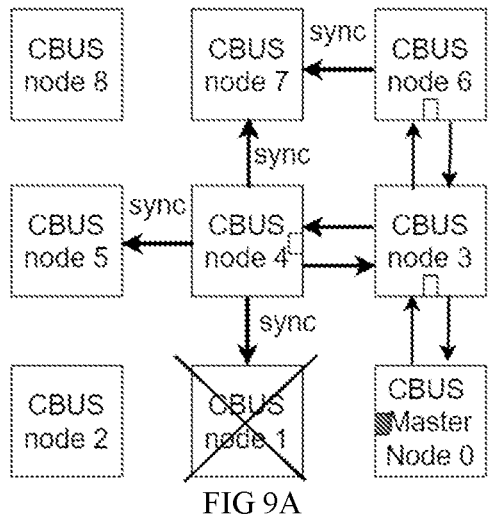
Figure 9B:
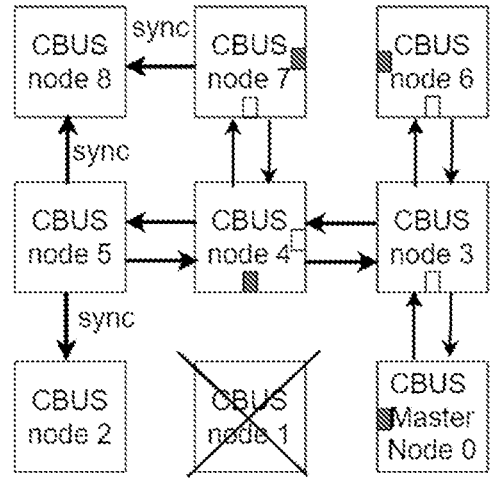
Figure 9C:
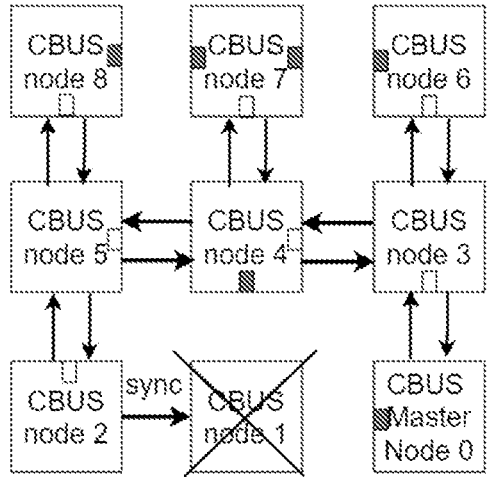
Figure 9D:
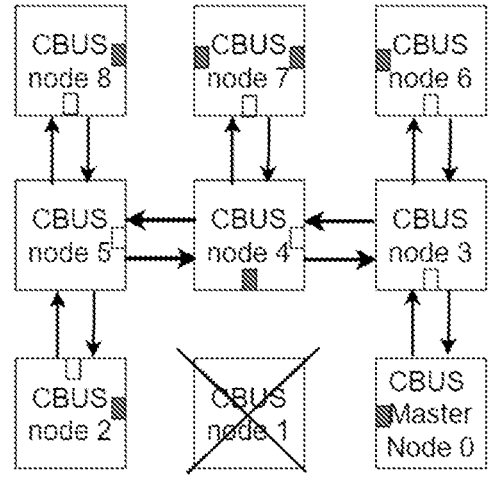

As shown in FIG. 8G, CBUS Node-3 receives the 'sync' signal from CBUS Master Node 0, and thus it assigns its bottom port as the Upstream Port. It also sends out the 'sync' signal on all ports. CBUS Node-4 and CBUS Node-6 receive the 'sync' signal from CBUS Node-3. CBUS Node-4 sets its right port as the Upstream Port while CBUS Node-6 sets its bottom port as Upstream Port. Both CBUS Nodes send out the 'sync' signal on all ports. Using the method described earlier, the CBUS Network will go through the following sequence of events, as illustrated in FIGS. 9A, 9B, 9C and 9D until it reaches the final steady state.

Figure 19A:
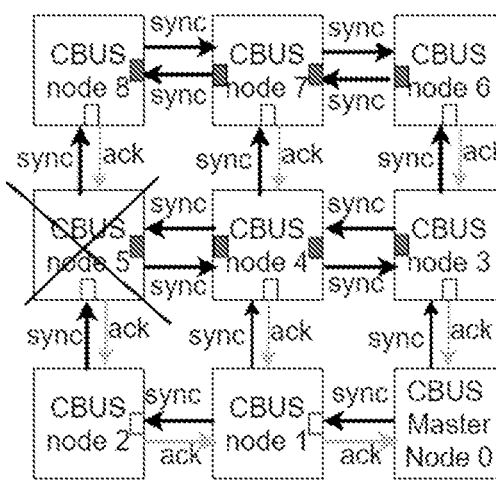
FIG. 19A to 19N are block diagrams showing the second embodiment of the implementation of network rediscovery or re-stubbing after powering down of a CBUS node.
Figure 19B:
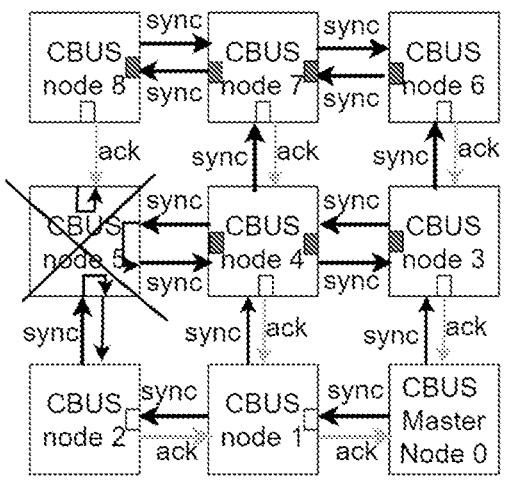
Figure 19C:
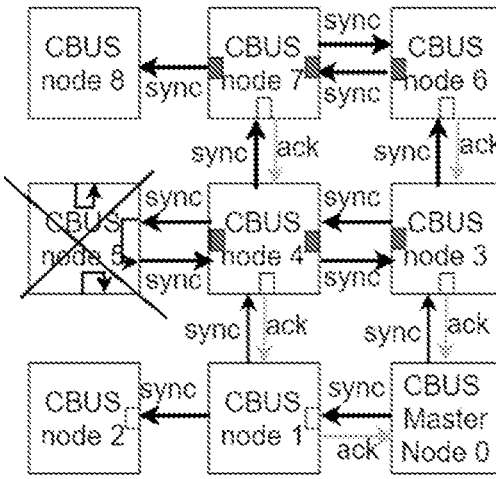
Figure 19D:
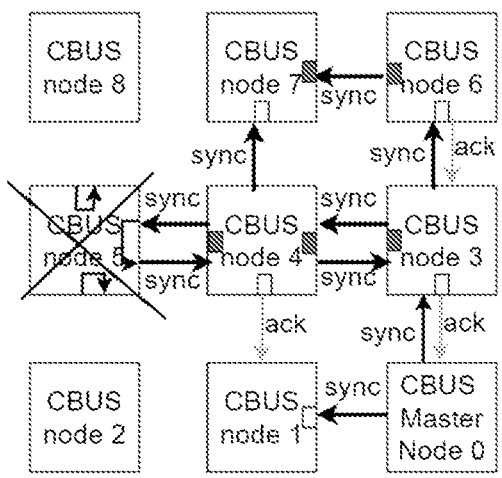
Figure 19E:
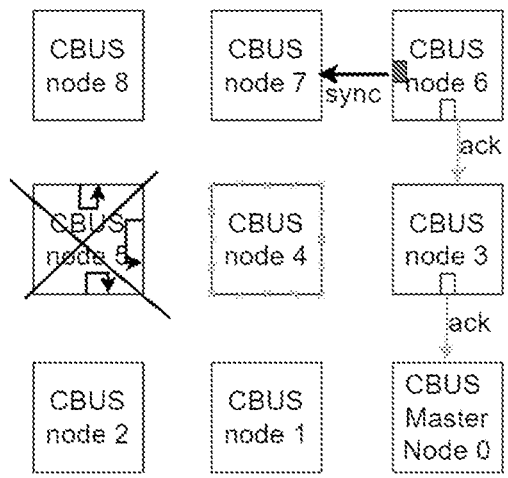
Figure 19F:
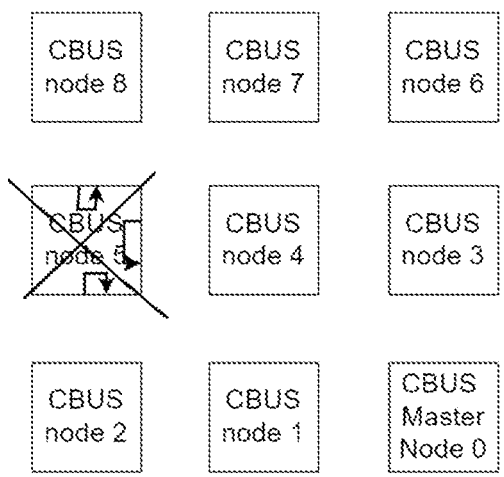
Figure 19G:
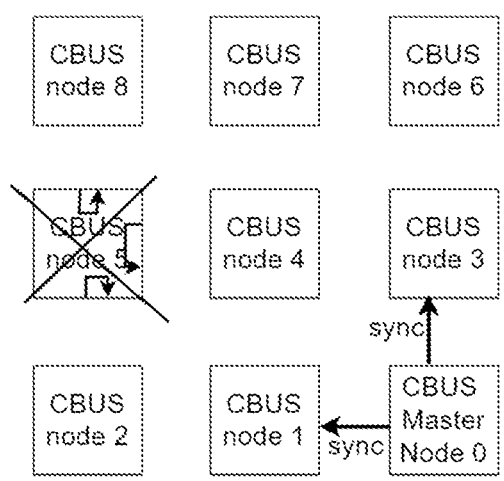
Figure 19H:
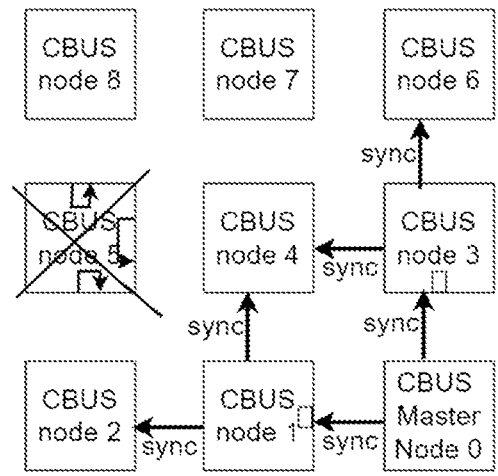
Figure 19I:
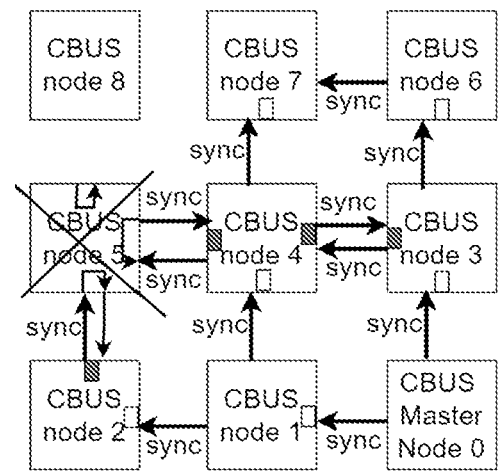
Figure 19J:
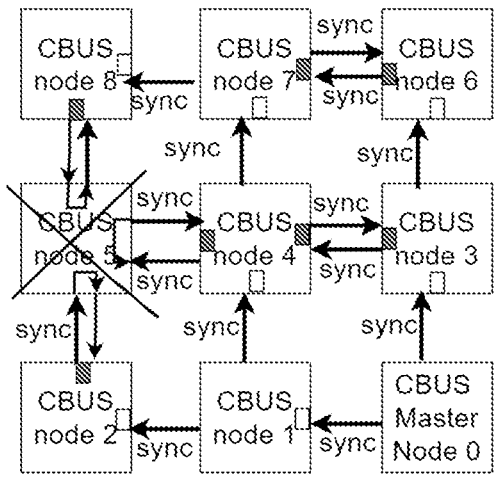
Figure 19K:
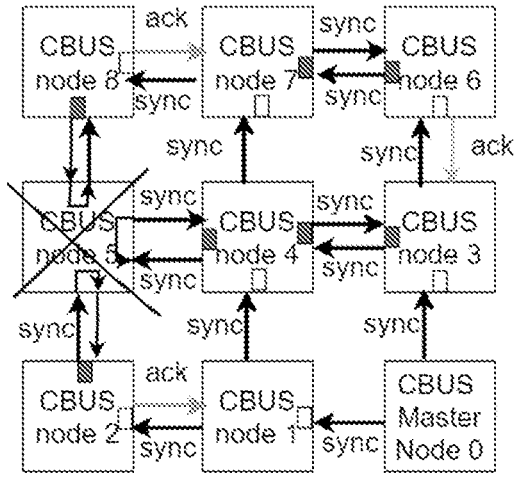
Figure 19L:
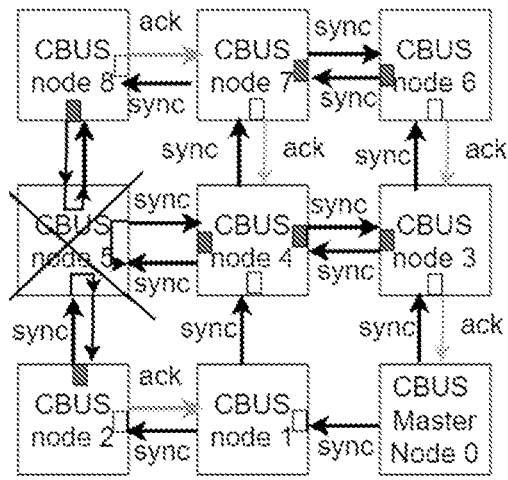
Figure 19M:
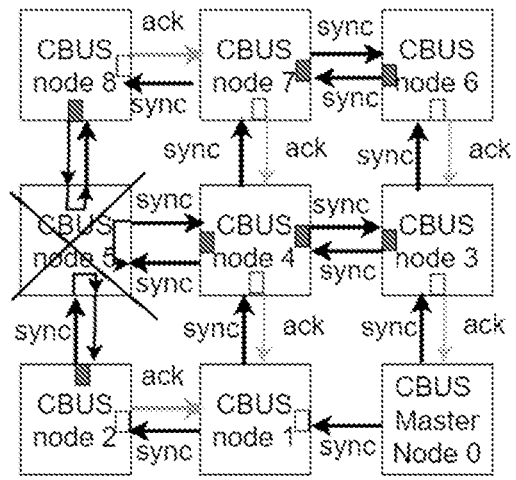
Figure 19N:
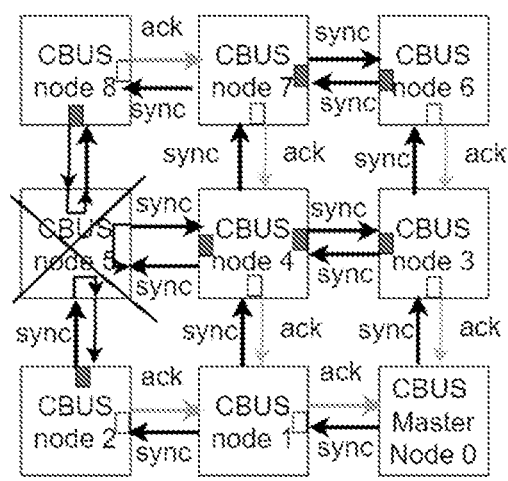

The following, as shown in FIG. 19A to 19N, explains an example of the implementation of the second embodiment of the method of performing network re-discovery and re-stubbing after said CBUS modes are brought down. The second embodiment of the method of performing network re-discovery and re-stubbing is done in line with the second embodiment of the method of dynamic network discovery and stubbing, whereby the 'ack' signal is used.

As shown in FIG. 19A, starting from the steady state, assuming that CBUS Node-5 is to be powered down. In this second embodiment method, when a CBUS Node is powered down, it will stop sending 'ack' signal from its upstream port and also stop sending 'sync' signals from its downstream ports. It will, however, feedback the received 'sync' signals on all its ports, as shown in FIG. 19B.

When CBUS Node-2 stops receiving the 'ack' signal from CBUS Node-5, said CBUS Node-2 senses a change in the network and will thus stop sending 'ack' signal and 'sync' signal on all its ports, as shown in FIG. 19C. CBUS Node-8, similarly stops receiving the 'sync' signal on its upstream port and thus said CBUS Node-8 senses a change in the network and will stop sending the 'ack' signal and 'sync' signal on all its ports.

Then CBUS Node-1 stops receiving 'ack' signal from CBUS Node-2 and thus stops sending 'ack' signal and 'sync' signal on all its ports, as shown in FIG. 19D. The CBUS Master stops receiving the 'ack' signal from CBUS Node-1 and thus stops sending 'sync' signal from all its downstream ports, as shown in FIG. 19E. Eventually, CBUS Node-3, CBUS Node-4, CBUS Node-6 and CBUS Node-7 will all detect missing 'sync' signal and stops sending 'sync' signal and 'ack' signal on all ports, as shown in FIG. 19F. In the end, the CBUS Master will lose 'ack' signal on all its downstream ports. When that happens, the CBUS Master knows that the CBUS Network is ready for Network Re-discovery and re-stubbing.

The second embodiment method to perform Network discovery and stubbing using the 'sync' signal and 'ack' signal is repeated. FIG. 19G to FIG. 19N show a process similar to the second embodiment of the method of performing dynamic discovery/assignment and stubbing whereby it starts with the CBUS Master repeating the network discovery process by sending out 'sync' signal on all its downstream ports, as shown in FIG. 19G. CBUS Node-1 receives the 'sync' signal on its right port and thus pre-assigns the right port as its upstream port. Similarly, CBUS Node-3 receives the 'sync' signal on its bottom port and thus pre-assigns the bottom port as its upstream port, as shown in FIG. 19H. Both nodes will then transmit the 'sync' signal on their other ports. This process continues until all nodes receive the 'sync' signal. Nodes that receive and also transmit the 'sync' signal on the same port will pre-assign that port as stubbed port. For CBUS Node-5 which has been disabled or powered down, it will loopback the 'sync' signal on all its ports, as shown in FIG. 19I. Thus, CBUS Node-4 sends out the 'sync' signal on its left port and also receives the 'sync' signal from CBUS Node-5, and will assign CBUS Node-4's left port as a stubbed port. The same goes to CBUS Node-8 and CBUS Node-2.

As shown in FIG. 19J, CBUS Node-6, CBUS Node-2 and CBUS Node-8 are leaf nodes where all their ports are either assigned as upstream ports or stubbed ports. They do not have any downstream ports. So, they will send back the 'ack' signal from their upstream ports, as shown in FIG. 19K. Subsequently, CBUS Node-7, CBUS Node-3 and CBUS Node-4 receives the 'ack' signal on their downstream ports and will also send the 'ack' signal from their upstream ports, as shown in FIG. 19L and FIG. 19M. This goes on until the CBUS Master receives the 'ack' signal on all its downstream ports and thus the network discovery and stubbing process is complete, as shown in FIG. 19N.

When implementing assignment and stubbing of said port (401) in a plurality of secondary networks (101) across multiple ICs (1201, 1203), whereby said plurality of secondary networks (101) comprise of multiple master network elements (103), only one master network element (103) is chosen to perform said assignment and stubbing while the other ports (401) in the other master network elements (103) are stubbed by at least one external microcontroller (109).

Figure 13A:
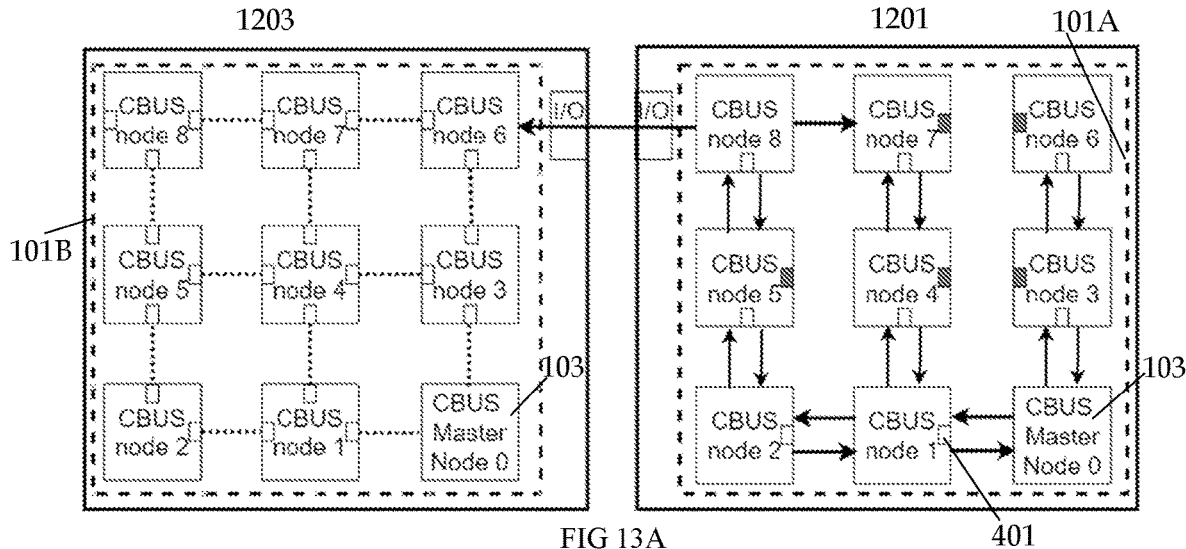
FIGS. 13A and 13B are block diagrams showing an example of the implementation of assignment and stubbing of port in a plurality of secondary networks across multiple ICs.
Figure 13B:
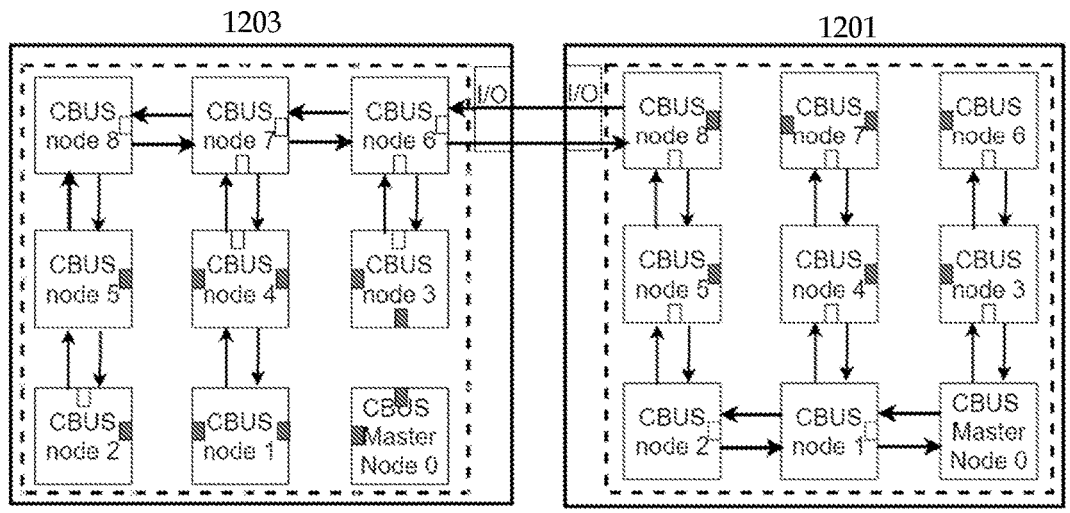

An example of the implementation of assignment and stubbing of port in a plurality of secondary networks across multiple ICs, as shown in FIG. 13A and FIG. 13B, is as follow. The example illustrates a 3×3 CBUS Node network arranged in a mesh in each chiplet/IC. CBUS Master Node is Node 0 and is the bottom-right node in Chiplet 0. The CBUS Master Node can send read/write requests to all other Nodes. First, after reset, all CBUS Nodes' ports are neutral, and they have not yet been assigned as Upstream or Downstream port. To the CBUS Master Node 0, all ports are downstream ports (no upstream port for CBUS Master Node). Externally, the system microcontroller or manager must disable CBUS Master Node in Chiplet 1 if it has been decided (though some external means) that the CBUS Master Node should be the one in Chiplet 0. After some time, Chiplet 0's state is as shown in FIG. 13A, where through the 'sync' signal process as described earlier, Chiplet 0 arrives at the steady state of Upstream Port/Downstream Port assignments. CBUS Node-8 of Chiplet 0 sends out the 'sync' signal on all its Downstream Ports. The 'sync' signal through its left port will get transmitted over to Chiplet 1. In Chiplet1, CBUS Node-6's right port receives the 'sync' signal from Chiplet 0 CBUS Node-8.

The right port of CBUS Node-6 in Chiplet 1 is assigned as Upstream Port, and it sends out the 'sync' signal on the left and bottom ports to its neighbouring CBUS nodes. The principle of discovery process applies the same for the rest of CBUS nodes in Chiplet 1 as described in Chiplet 0. CBUS Master Node in Chiplet 1 is disabled and it does not respond to 'sync' signals. So, CBUS Node-3 and CBUS Node-1 in Chiplet 1 will stub their bottom and left ports respectively as they will timeout not receiving the reciprocal 'sync' signal. FIG. 13B is the final steady state on both Chiplet 0 and Chiplet 1 after Dynamic Discovery.

In a coherent NOC, sometimes a main NOC's network element will announce its desire to participate or not in the cache coherency protocol of a system by asserting or deasserting a System Coherency Request signal. In a system with multiple NOC network elements, it is not practical to route this System Coherency Request signal to every other NOC network element and the Home Node in the system. To accomplish this, is it presented a method of the present invention to packetize the System Coherency Request signal in a CBUS message packet and send it back to the CBUS Master Node. In response, the CBUS Master Node will broadcast a write request to all CBUS Nodes and the Home Nodes with a specific register address that indicates System Coherency participation each CBUS Node.

The NOC (107) enables system coherency by establishing a handshake between a 'system coherency request signal' (SYSCOREQ) and a 'system coherency acknowledge signal' (SYSCOACK), comprising the following steps. In step (i), first NOC element (111A) asserting said SYSCOREQ signal, wherein said asserted SYSCOREQ signal is captured by at least one third basic network element (105C) of said secondary network (101). In step (ii), said third basic network element (105C) packetizing said asserted SYSCOREQ signal into a message data packet. In step (iii), said third basic network element (105C) transmitting said message data packet with asserted SYSCOREQ signal to neighbouring basic network element (105) up to said master network element (103) of said secondary network (101).

In step (iv), said master network element (103) triggering a message interrupt to at least one external microcontroller (109), for said external microcontroller (109) to read said message data packet from master network element (103) to identify location of said first NOC element (111A). In step (v), said master network element (103) transmitting write request data packet through said downstream port (401B) to neighbouring basic network element (105); wherein said write request data packet comprises of node identification (ID) field equivalent to a fourth basic network element's (105D) ID, before said fourth basic network element (105D) setting specific bit at its coherency request register of its local register equivalent to said location of said first NOC element (111A). In step (vi), said fourth basic network element (105D) asserting said SYSCOREQ signal with location of said first NOC element (111A) to at least one second NOC element (111B). In step (vii), said second NOC element (111B) asserting SYSCOACK signal with location of said first NOC element (111A) to said fourth basic network element (105D).

In step (viii), said fourth basic network element (105D) transmitting message data packet with asserted SYSCOACK signal with location of said first NOC element (111A) to neighbouring CBUS network element (201) up to said master network element (103) of said secondary network (101). In step (ix), said master network element (103) transmitting write request data packet through said downstream port (401B) to neighbouring basic network element (105); wherein said write request data packet comprises of node ID field equivalent to said third basic network element's (105C) ID, before said third basic network element (105C) setting specific bit at its coherency acknowledge register of its local register equivalent to the location of said second NOC element (111B).

Figure 10A:
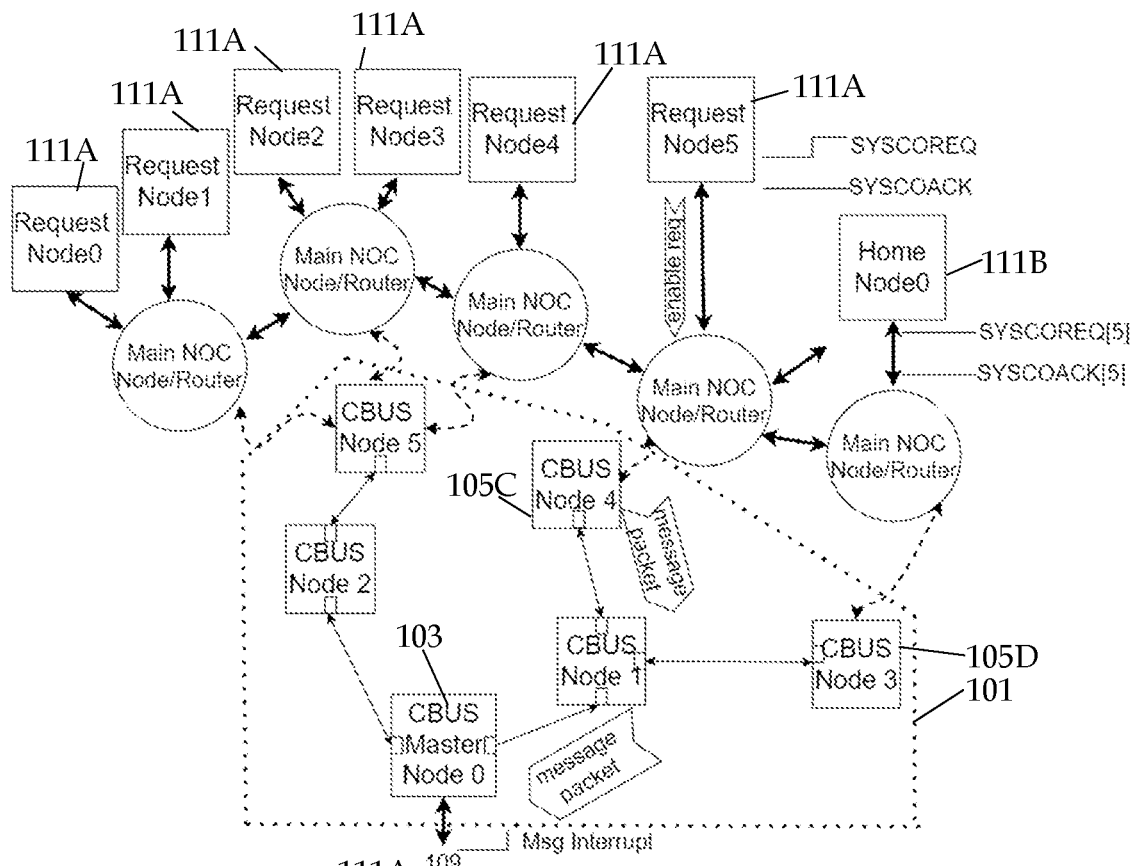
FIG. 10A to 10D are block diagrams showing an example of implementation of the NOC enabling system coherency.

An example of said method is the secondary network/CBUS network running alongside the main NOC as shown in FIGS. 10A, 10B, 10C and 10D. As shown in FIG. 10A, when the first NOC element (111A) (referred to in this example as Main Requester Node-5) asserts a 'System Coherency Request' signal (SYSCOREQ), this signal is picked up by a third basic network element (105C) (referred to in this example as CBUS Node-4), by ways of a direct wire connection to CBUS Node-4. CBUS Node-4 will packetize the SYSCOREQ in a message packet, that is sent upstream to the master network element (103) (referred to in this example as CBUS Master Node). All message packets will travel upstream and are guaranteed to reach the CBUS Master Node. When CBUS Master Node receives the message packet from CBUS Node-4, it triggers a message interrupt to the external microcontroller or manager (109). As an example, a message packet may contain a 4-bit field to identify the type of message and an 8-bit field to convey the message data. Upon interrupt, the external microcontroller or manager (109) can read the received message packet from the CBUS Master Node, and will use these 2 fields to identify that it is a SYSCOREQ signal assertion message from Main NOC Requester Node-5.

In the example, it is further assumed that a second NOC element (111B) (referred to in this example as Home Node 0) is connected to main NOC and is serviced by the fourth basic network element (105D) (referred to in this example as CBUS Node-3). CBUS Node-3 has a local register, called the coherency request register, with the number of bits that corresponds to the number of Requester Nodes in the system, and when a bit is set, it means the corresponding Requester Node has asserted the SYSCOREQ signal and this will cause a local signal, System Coherency Request Node 5, or SYSCOREQ[5] in short, to be asserted to Home Node 0.

Figure 10B:
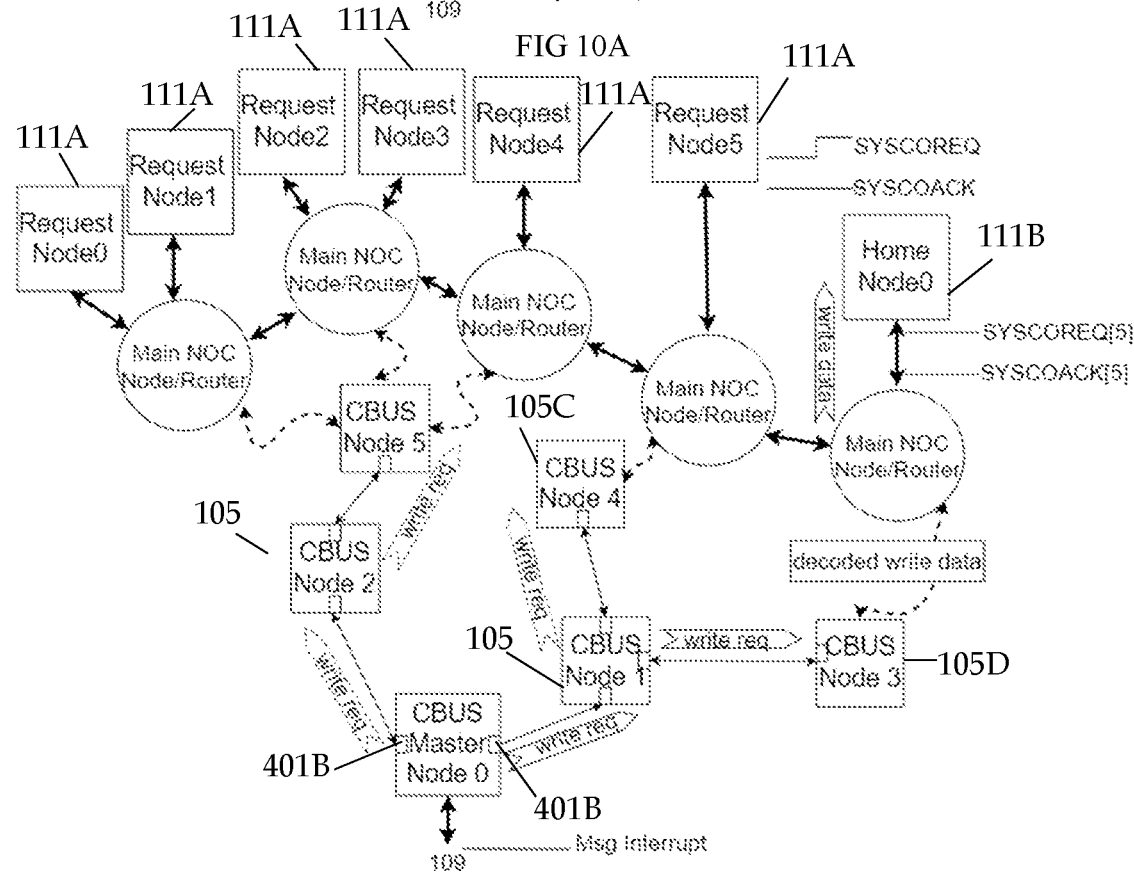

As shown in FIG. 10B, a write request packet to set bit-5 of the coherency request register is broadcasted to all basic network elements (105) (referred to in this example as CBUS Nodes) via CBUS Master node but only CBUS Node-3 will accept this write request because the write request's node ID field is same as CBUS Node-3's ID. Now CBUS Node-3 will set bit-5 of the coherency node register.

Figure 10C:
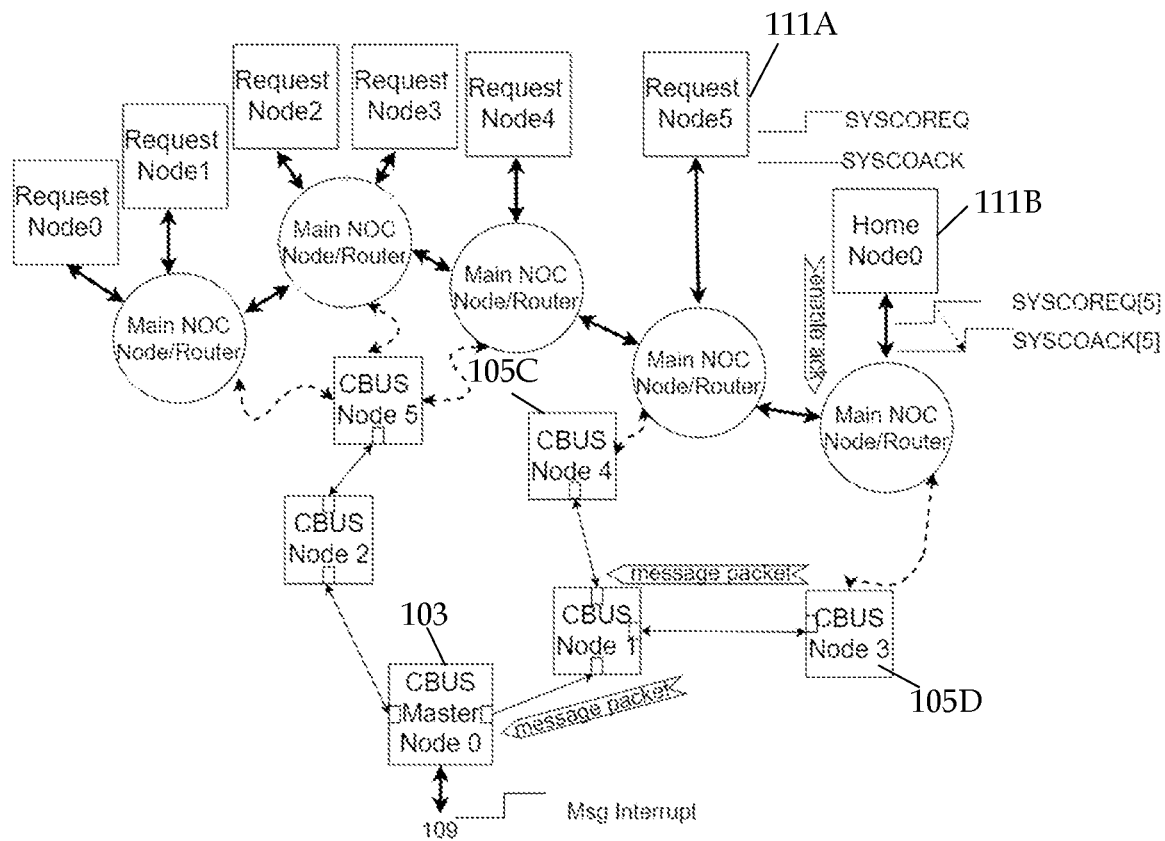

When CBUS Node-3's coherency request register bit-5 is set, the register drives a wire, called SYSCOREQ[5], to Home Node 0. Home Node 0 acknowledges this by asserting another wire, the System Coherency Acknowledge bit-5 (or SYSCOACK[5]) to CBUS Node-3, as shown in FIG. 10C. This acknowledgement assertion event is captured by CBUS Node-3, and this causes a message packet to be sent back to the CBUS Master Node. All message packets will travel upstream and are guaranteed to reach the CBUS Master Node. When CBUS Master Node receives the message packet from CBUS Node-3, it triggers a message interrupt to the external microcontroller or manager. The message packet returned by CBUS Master Node will identify that SYSCOACK[5] signal is asserted from Home Node 0.

Figure 10D:
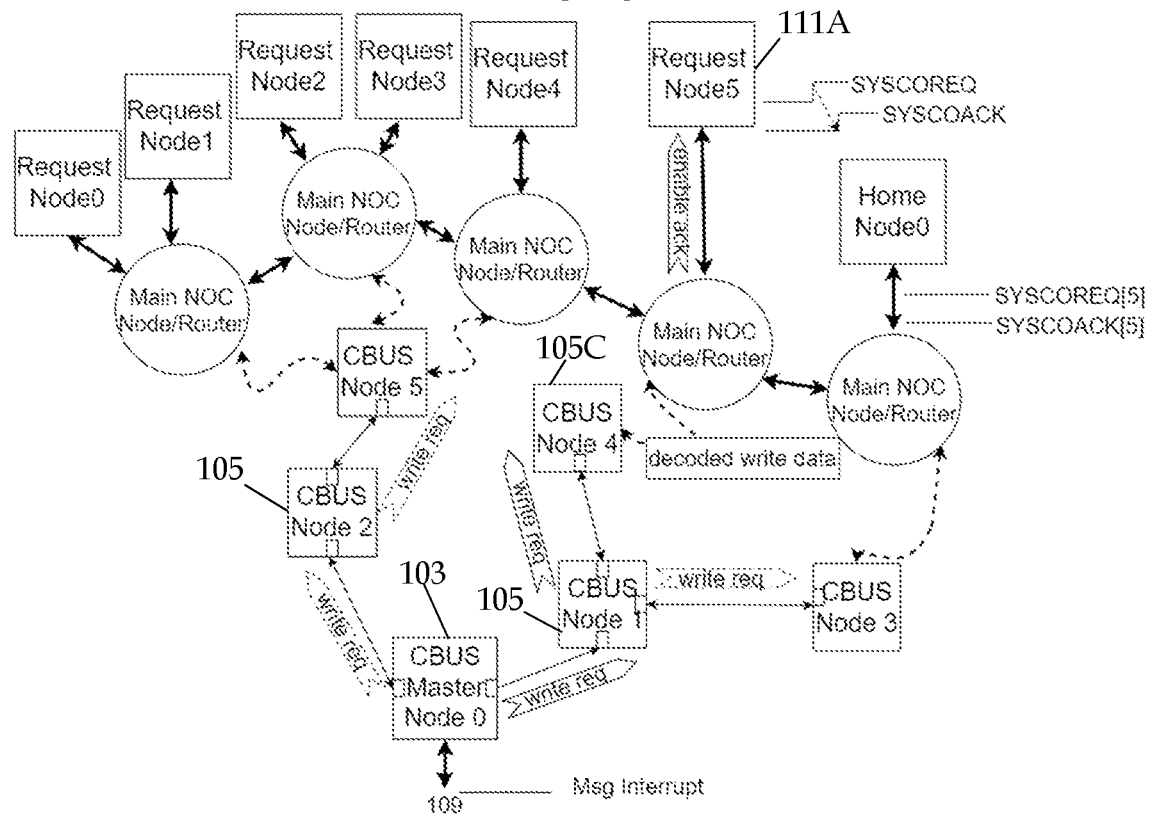

In the example, it is further assumed that a CBUS Node-4, which is servicing Requester Node-5, has a local register, called the coherency acknowledge register. When this register is set, it will cause a wire, the System Coherency Acknowledge (SYSCOACK) signal, to be asserted for Requester Node-5. As shown in FIG. 10D, CBUS Master will broadcast a write request to CBUS Node-4 to set the coherency acknowledge registers. The write request packet is broadcasted to all CBUS Nodes but only CBUS Node-4 will accept this write request because the write request's node ID field is same as CBUS Node-4's ID. Now CBUS Node-4 will set the coherency acknowledge register. The register drives a wire, the SYSCOACK signal to Requester Node-5. Hence, this concludes the SYSCOREQ and SYSCOACK handshake between Requester Node-5 and Home Node 0 via CBUS Network.

The NOC (107) is also capable of de-asserting the system coherency request signal and system coherency acknowledge signal. The NOC (107) disables system coherency by establishing a handshake between a 'system coherency request signal' (SYSCOREQ) and a 'system coherency acknowledge signal' (SYSCOACK), comprising the following steps. In step (i), first NOC element (111A) de-asserting said SYSCOREQ signal, wherein said de-asserted SYSCOREQ signal is captured by at least one third basic network element (105C) of said secondary network (101).

In Step (ii), said third basic network element (105C) packetizing said de-asserted SYSCOREQ signal into a message data packet. In step (iii), said third basic network element (105C) transmitting said message data packet with de-asserted SYSCOREQ signal to neighbouring CBUS network element (201) up to said master network element (103) of said secondary network (101). In step (iv), said master network element (103) triggering a message interrupt to at least one external microcontroller (109), for said external microcontroller (109) to read said message data packet from master network element (103) to identify location of said first NOC element (111A).

In step (v), said master network element (103) transmitting write request data packet through said downstream port (401B) to neighbouring basic network element (105); wherein said write request data packet comprises of node identification (ID) field equivalent to a fourth basic network element's (105D) ID, before said fourth basic network element (105D) resetting specific bit at its coherency request register of its local register equivalent to said location of said first NOC element (111A). In step (vi), said fourth basic network element (105D) de-asserting said SYSCOREQ signal with location of said first NOC element (111A) to at least one second NOC element (111B). In step (vii), said second NOC element (111B) de-asserting SYSCOACK signal with location of said first NOC element (111A) to said fourth basic network element (105D).

In step (viii), said fourth basic network element (105D) transmitting message data packet with de-asserted SYSCOACK signal with location of said first NOC element (111A) to neighbouring CBUS network element (201) up to said master network element (103) of said secondary network (101). In step (ix), said master network element (103) transmitting write request data packet through said downstream port (401B) to neighbouring basic network element (105); wherein said write request data packet comprises of node ID field equivalent to said third basic network element's (105C) ID, before said third basic network element (105C) resetting specific bit at its coherency acknowledge register of its local register equivalent to the location of said second NOC element (111B).

Figure 11A:
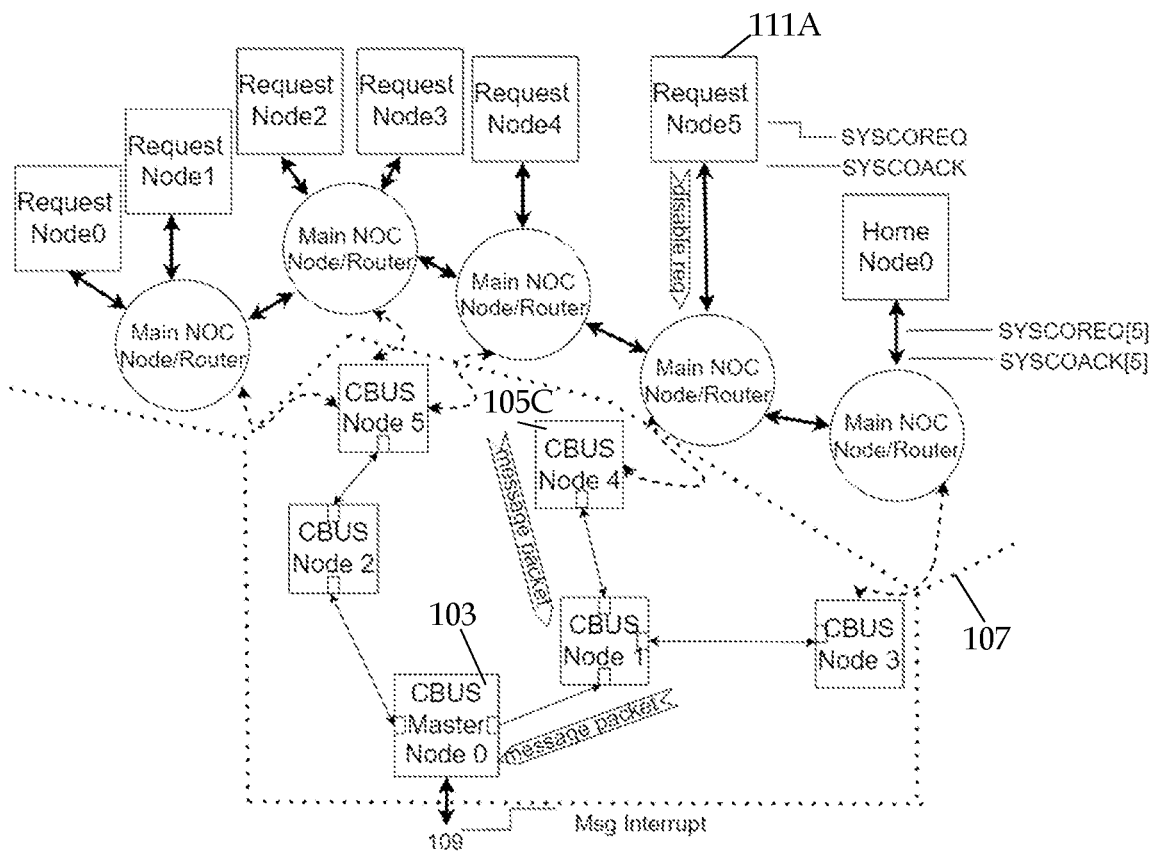
FIG. 11A to 11D are block diagrams showing an example of implementation of the NOC disabling system coherency.
Figure 11B:
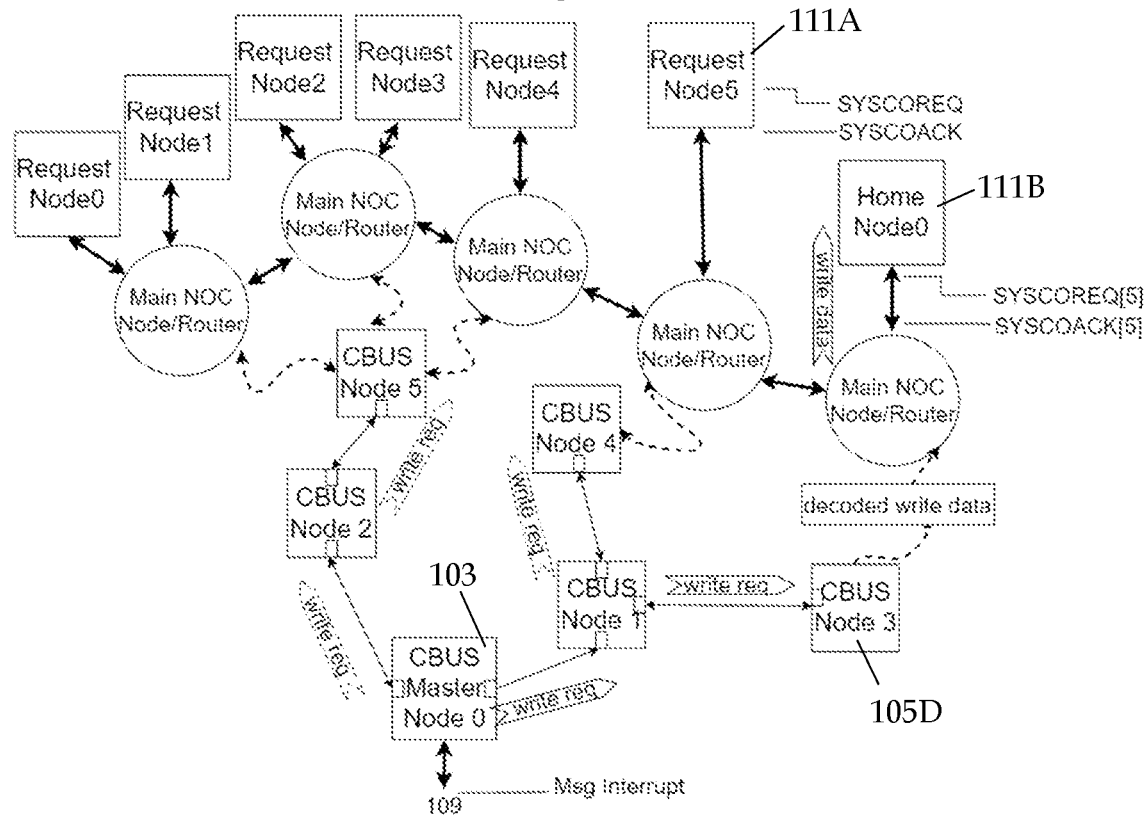

An example of how the NOC (107) disables the system coherency is explained as follow. It is assumed that the first NOC element (111A) (referred to in this example as Request Node 5) de-asserts SYSCOREQ signal, a third basic network element (105C) (referred to in this example as CBUS Node-4) captures the signal de-assertion and it sends a message packet back to the master network element (103) (referred to in this example as CBUS Master Node), as shown in FIG. 11A. As shown in FIG. 11B, CBUS Master returns message packet and identifies it as a SYSCOREQ de-assertion from Request Node 5. CBUS Master Node will send a write request to reset bit-5 of the fourth basic network element's (105D) (referred to in this example as CBUS Node-3) coherency request register. The write request packet is broadcasted but eventually it reaches CBUS Node-3 and CBUS Node-3 will reset bit-5 of its coherency request register. This causes SYSCOREQ[5] to a second NOC element (111B) (referred to in this example as Home Node 0) to be de-asserted.

Figure 11C:
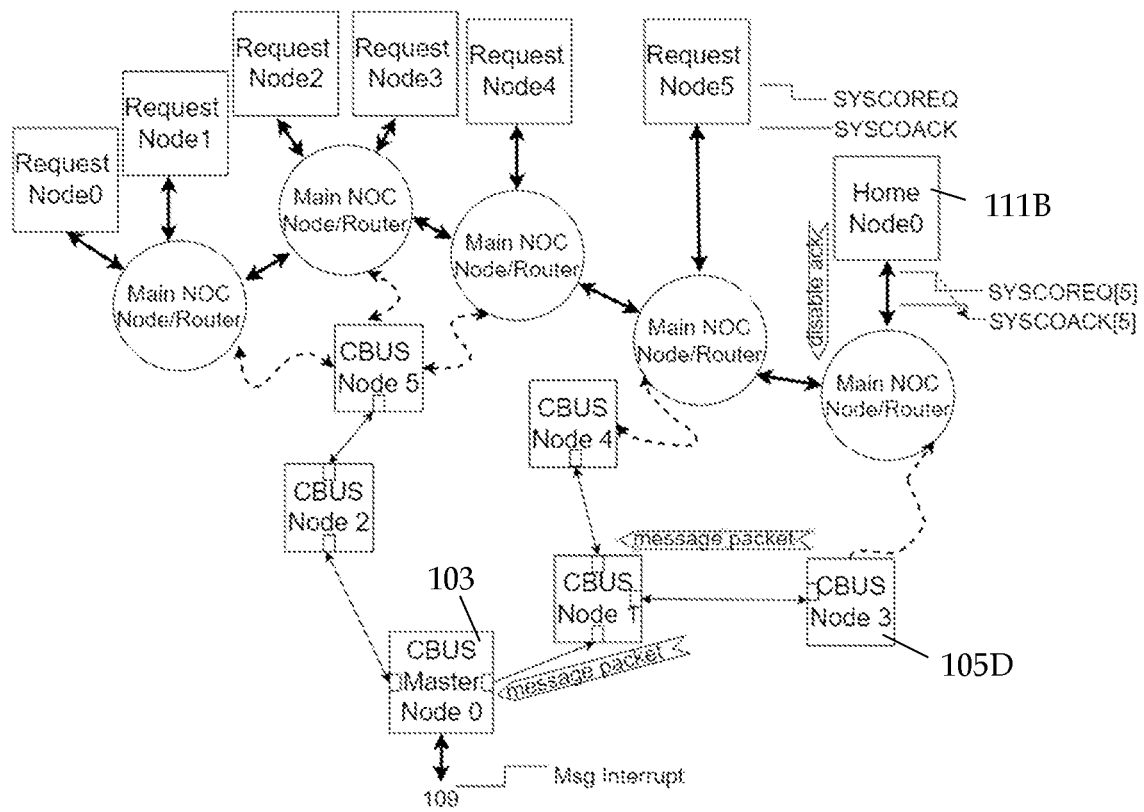

As shown in FIG. 11C, Home Node 0 responds to the de-assertion of SYSCOREQ[5] by also de-asserting SYSCOACK[5] (normally after it has waited for all pending snoops to Requester Node-5 to be completed). The de-assertion of SYSCOACK[5] will be captured by CBUS Node-3, which results in a message packet being sent back to the CBUS Master Node.

Figure 11D:
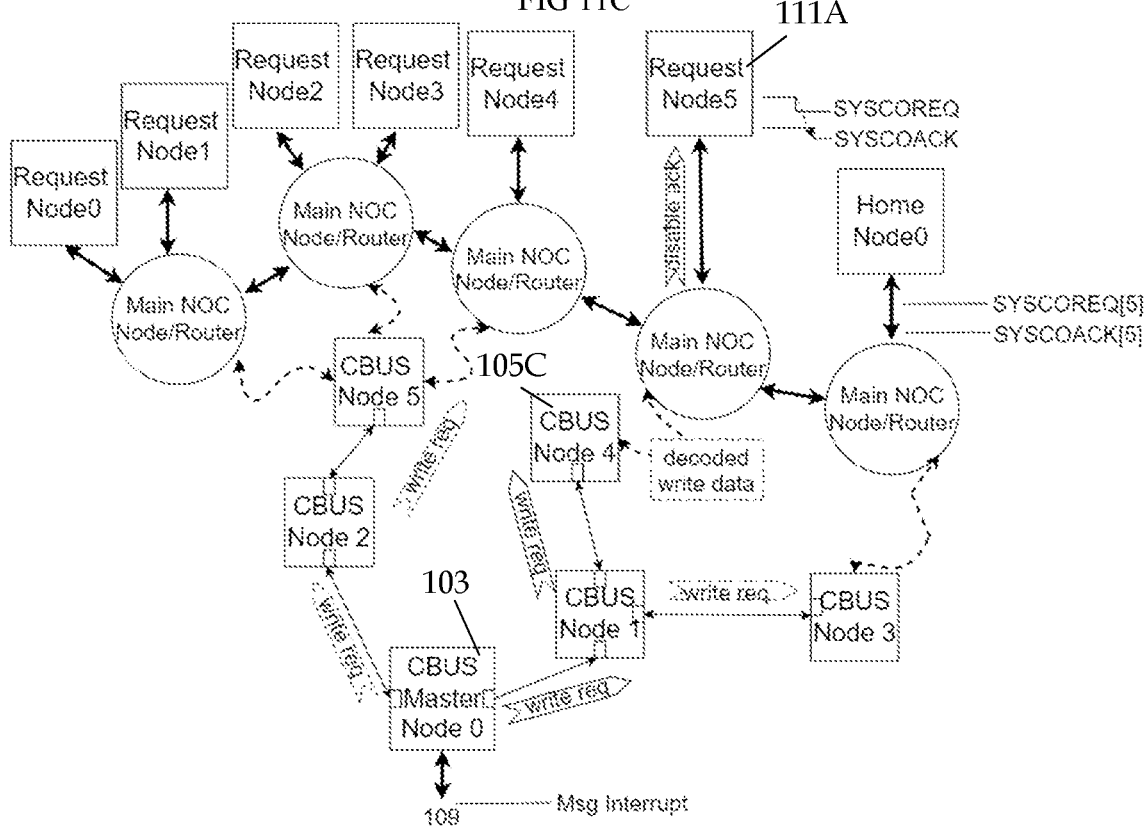

CBUS Master learns that SYSCOREQ[5] from Home Node 0 has been de-asserted. As shown in FIG. 11D, CBUS Master Node broadcasts a write request to reset CBUS Node-4's coherency acknowledge register. Eventually CBUS Node-4 receives the write request packet, and then reset the coherency acknowledge register, which causes SYSCOACK signal to be de-asserted to Requester Node-5. Hence this completes the SYSCOREQ/SYSCOACK de-assertion handshake between Requester Node-5 and Home Node 0.

Figure 14A:
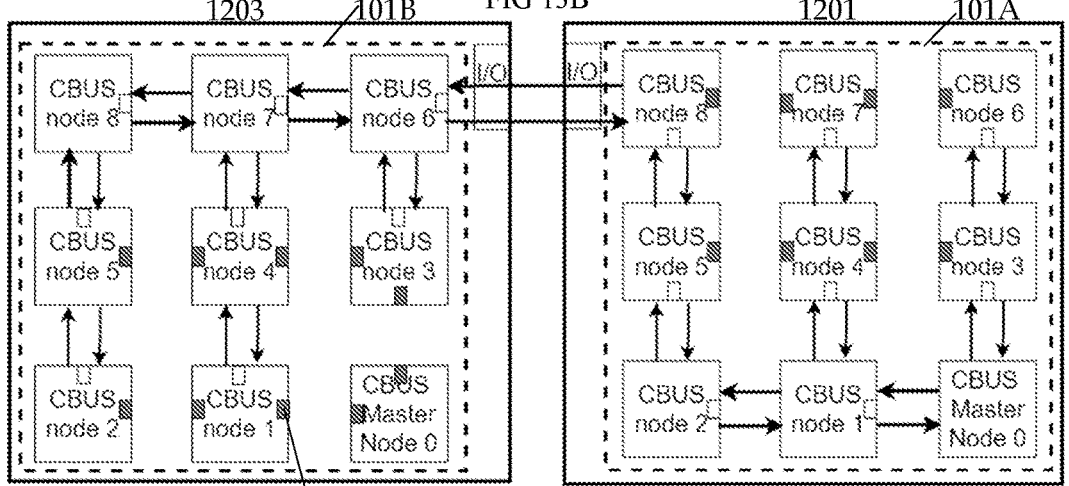
FIG. 14A to 14I and FIG. 15A to 15D are block diagrams showing an example of the implementation of a mechanism to assign node ID to each CBUS Node.

After assignment and stubbing of said port (401) in plurality of secondary networks (101) across multiple ICs (1201, 1203), there is a secondary network that spans across multiple ICs (1201, 1203), as shown in FIG. 14A. However, there is still a need to have a mechanism to assign Node ID to each CBUS network element so that read requests and targeted write requests can be sent to specific CBUS network element. One mechanism that is proposed in the present invention is an auto-enumeration scheme to dynamically assign Node ID to each CBUS network element, regardless of whether they reside in the first IC (1201) or the second IC (1203).

The method of the present invention further comprises of a method of dynamic assignment of node ID of CBUS network element (201) in said plurality of secondary networks (101) across said multiple ICs (1201, 1203), comprising the following steps. In step (i), a chosen master network element (103) transmitting write request data packet through its first priority downstream port (401B) to the neighbouring basic network element (105); wherein said write request data packet comprises of a node ID counter value and a predetermined address code identifying said write request data packet as an enumeration write.

Figure 14B:
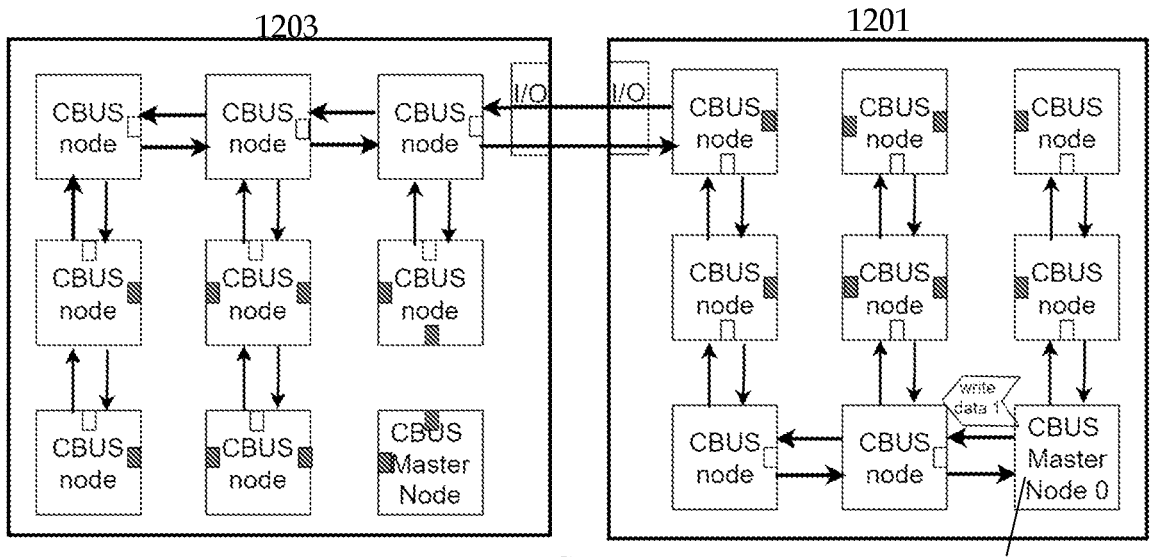

In step (ii), upon said neighbouring basic network element (105) receiving said write request data packet from said chosen master network element (103), said basic network element (105) updating its own node ID according to the latest node ID counter value. In step (iii), said basic network element (105) adding value of said node ID counter value by '1' in said write request data packet before transmitting said write request data packet to the subsequent neighbouring basic network element (105) through its first priority downstream port (401B). Steps (ii) and (iii) are repeated within or across said multiple ICs (1201, 1203) until there is no further downstream neighbouring basic network element (105), whereby the latest basic network element (105) is a first end basic network element (105E), as shown in FIG. 14D.

The method further comprises of step (iv), upon said first end basic network element (105E) updating its own node ID according to the latest node ID counter value, said first end basic network element (105E) adding value of said node ID counter value by '1' in a message data packet before transmitting said message data packet, through its subsequent priority upstream port (401A), to an upstream neighbouring basic network element (105) which has unassigned node ID.

In step (v), upon said upstream neighbouring basic network element (105) receiving said message data packet from its downstream basic network element (105), said upstream neighbouring basic network element (105) updating its own node ID according to the latest node ID counter value if said upstream neighbouring basic network element (105) has unassigned node ID; while said upstream neighbouring basic network element (105) maintaining its existing node ID if said upstream neighbouring basic network element (105) has its assigned node ID.

In step (vi), said upstream neighbouring basic network element (105) checking whether there is unassigned downstream neighbouring basic network element (105); wherein if there is unassigned downstream neighbouring basic network element (105), said basic network element (105) transmitting a write request data packet with the latest node ID counter value to said unassigned downstream neighbouring basic network element (105) until no further downstream neighbouring basic network element (105) is available; wherein if there is no unassigned downstream neighbouring basic network element (105), said basic network element (105) transmitting a message data packet with the latest node ID counter value to its upstream neighbouring basic network element (105). Steps (v) and (vi) are repeated until said chosen master network element (103) is reached.

FIG. 14A to 14I and FIG. 15A to 15D show an example of how auto-enumeration is implemented. FIG. 14A shows the initial state of the secondary networks (101) across said multiple ICs (1201, 1203). As shown in FIG. 14B, enumeration starts with a chosen master network element (103) (referred to in this example as CBUS Master Node) sending a write request down its first downstream port, which is the left port. The write request contains a data value of '1' and a special address to identify it as an enumeration write. The basic network element (105) (referred to in this example as CBUS Node) on the left of CBUS Master Node, receives the write request with the enumeration write special identifier and thus updates its own node ID as '1'.

Figure 14C:
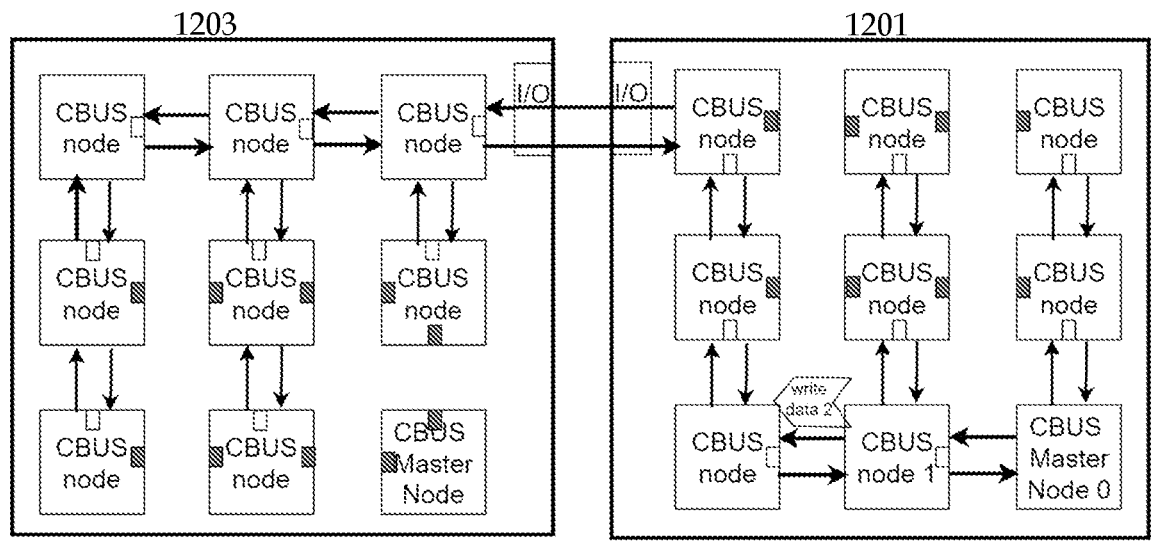
Figure 14D:
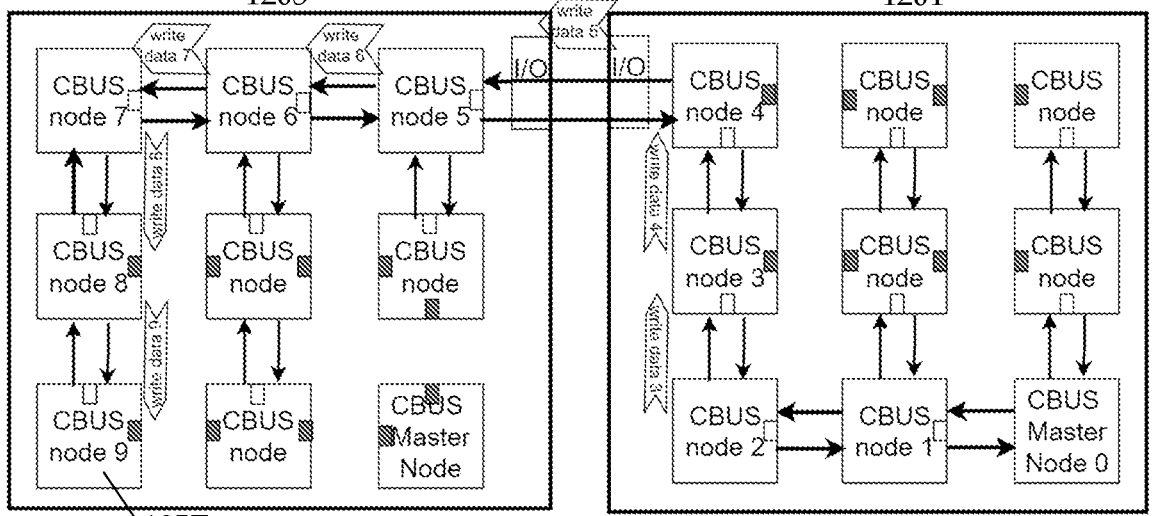

As shown in FIG. 14C, because this is a special enumeration write, said CBUS Node on the left of the CBUS Master Node (now updated as CBUS node-1) will forward the write request to its first downstream port, which is the left port, with data value of '2'. The left CBUS Node of CBUS Node-1 receives this write request and updates its node ID as '2'.

As shown in FIG. 14D, said left CBUS Node of CBUS Node-1 (now updated as CBUS Node-2) forwards the write request from its first downstream port, which is the top port, with data value of '3'. The CBUS Node above CBUS Node-2 receives this write request and updates its node ID as '3', thereafter updated as CBUS Node-3. With the same method, after a few iterations, we now get CBUS Node-3 to CBUS Node-9.

Figure 14E:
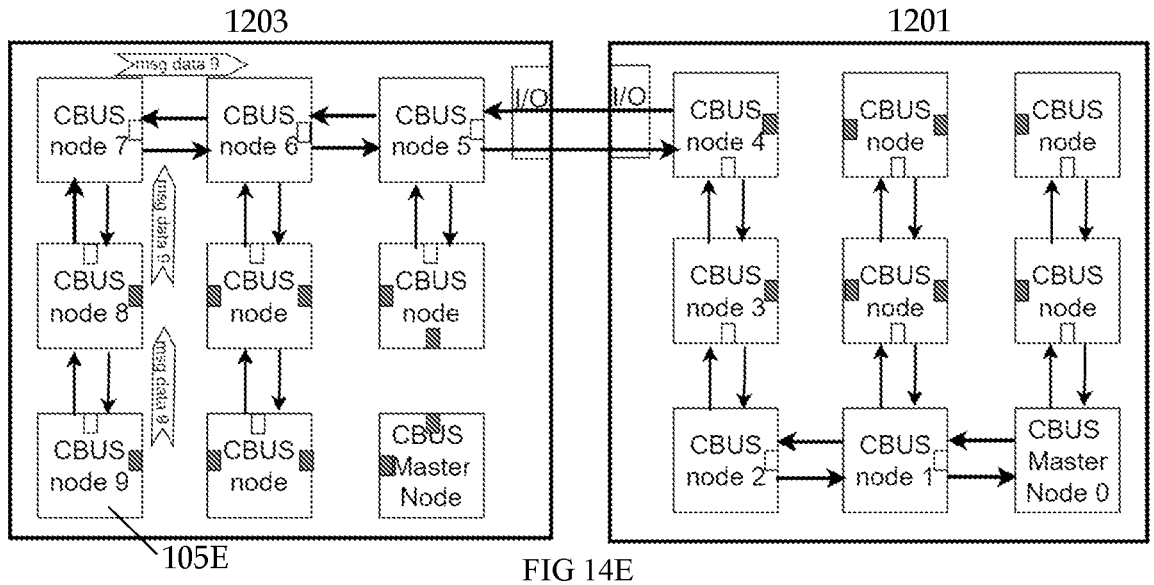

As shown in FIG. 14E, CBUS Node-9 is a first end basic network element (105E)/leaf node where it has no other downstream ports to forward the write request. It is deemed that the enumeration process downstream of CBUS Node-9 is complete. So, CBUS Node-9 will return a message packet with enumeration type, and data value of '9' (CBUS Node-9's own node ID), upstream.

CBUS Node-8 receives the message from its downstream port, and this indicates that the enumeration process downstream of CBUS Node-8 is complete. Since it has no other downstream port, CBUS Node-8 passes this message packet up from its upstream port to CBUS Node-7.

CBUS Node-7 receives the message from its downstream port, and this indicates that the enumeration process downstream of CBUS Node-7 is complete. So, CBUS Node-7 passes this message packet up to its upstream port to CBUS Node-6.

Figure 14F:
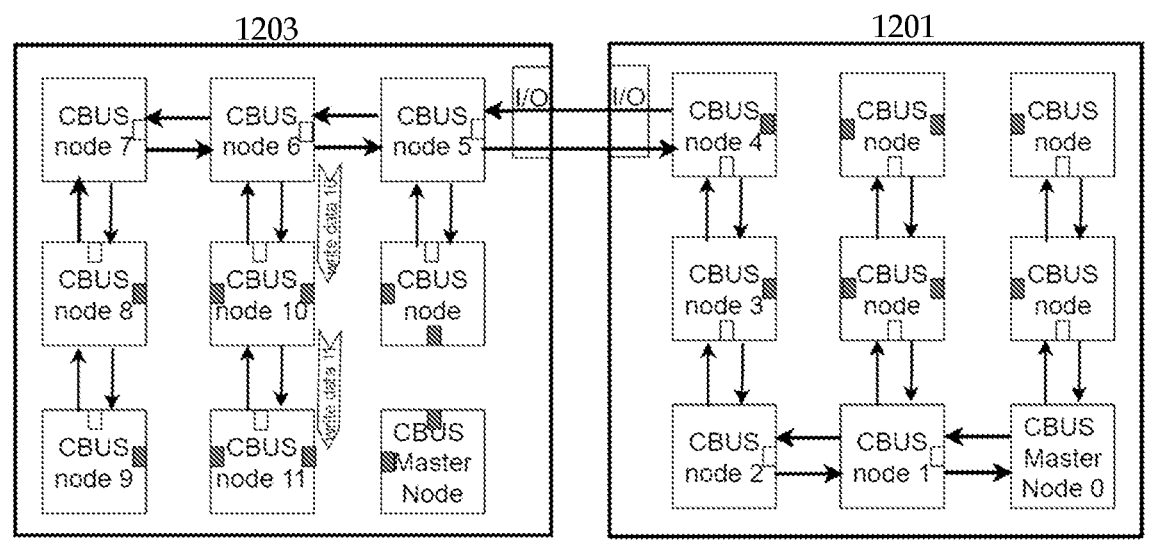

CBUS Node-6 receives the message from its downstream port, and this indicates that the enumeration process downstream of CBUS Node-6's left port is complete. The data value of 9 received at CBUS Node-6 indicates to CBUS Node-6 that the highest node ID of the downstream nodes left of CBUS Node-6 is 9. However, CBUS Node-6 still has the bottom port which it has not yet send the enumeration write request. So, CBUS Node-6 sends down an enumeration write request with data value of '10' down its bottom port, as shown in FIG. 14F. This data value of '10' is obtained by incrementing the message packet's data value of 9 by 1.

The CBUS Node below CBUS Node-6 receives this write request and updates its node ID as '10', and forwards the next write request down with data value of '1'. The CBUS Node below CBUS Node-10 receives this write request and updates its ID as '11'.

Figure 14G:
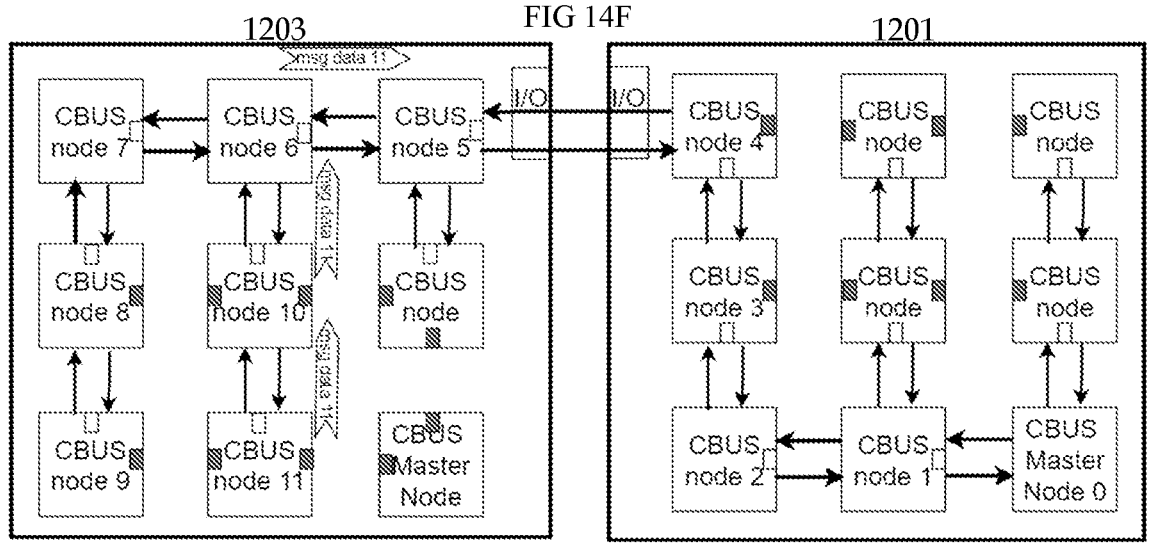

As shown in FIG. 14G, CBUS Node-11 is a leaf node where it has no other downstream ports to forward the write request. It is deemed that the enumeration process downstream of CBUS Node-11 is complete. So, CBUS Node-11 will return a message packet with enumeration type, and data value of '11' (CBUS Node-11's own ID), upstream.

CBUS Node-10 receives this message and this indicates that the enumeration process downstream of CBUS Node-10 is complete. Since it has no other downstream port, CBUS Node-10 passes this message packet up to its upstream port to CBUS Node-6.

CBUS Node-6 receives this message and this indicates that the enumeration process downstream of the bottom port of CBUS Node-6 is complete. Both of the downstream ports of CBUS Node-6 has completed enumeration. Since it has no other downstream ports left to send the enumeration write request, CBUS Node-6 passes this message packet up to its upstream port, to CBUS Node-5.

Figure 14H:
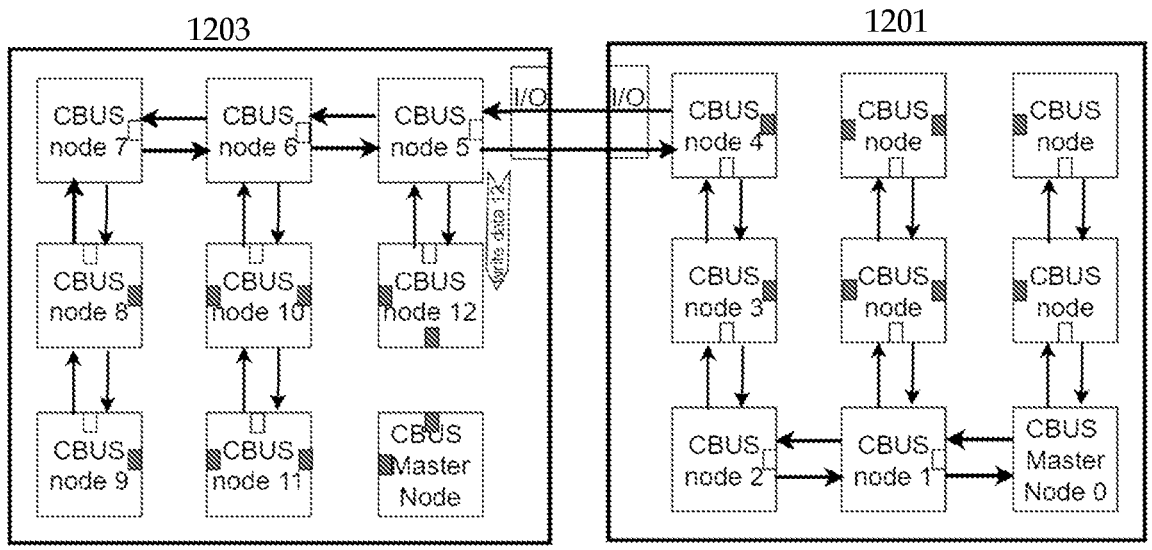
Figure 14I:
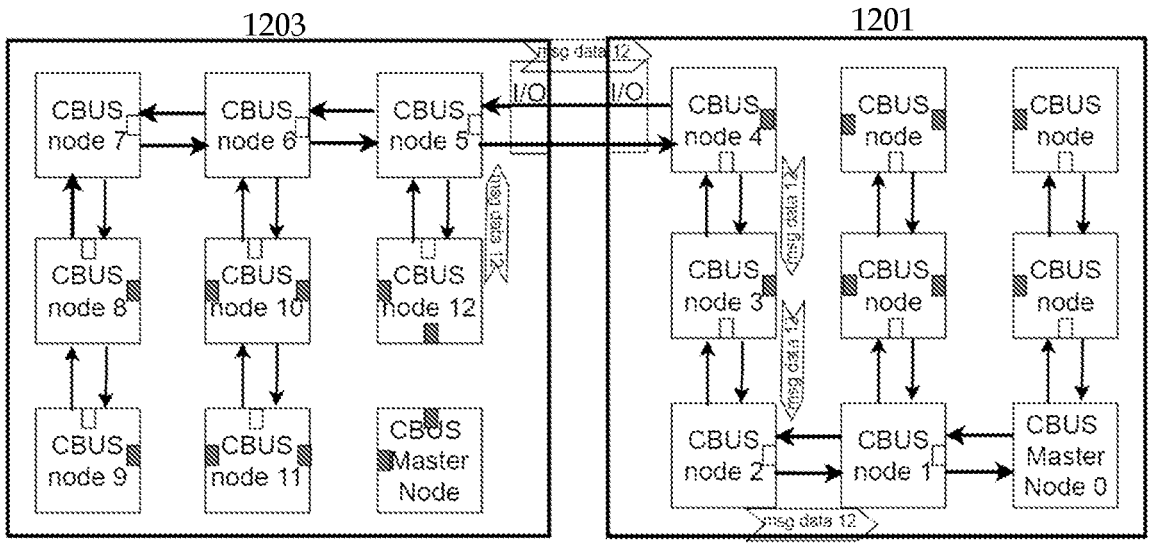
Figure 15A:
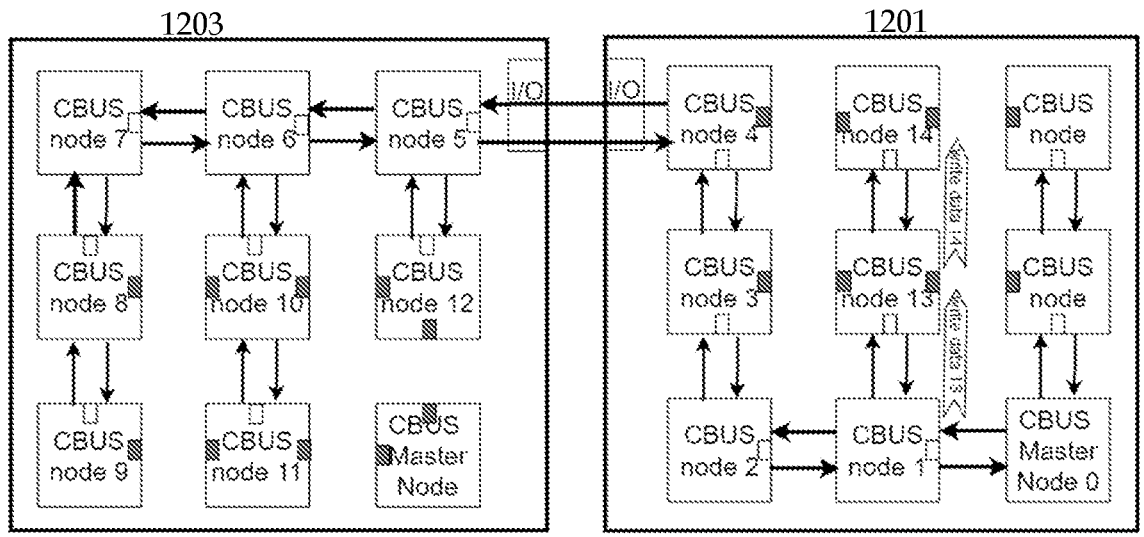
Figure 15B:
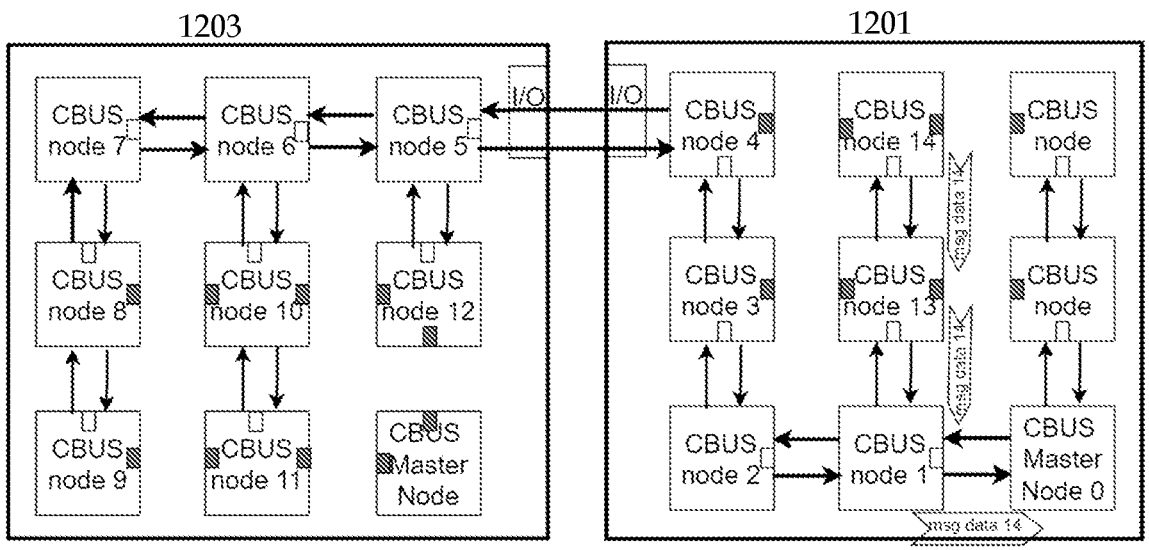
Figure 15C:
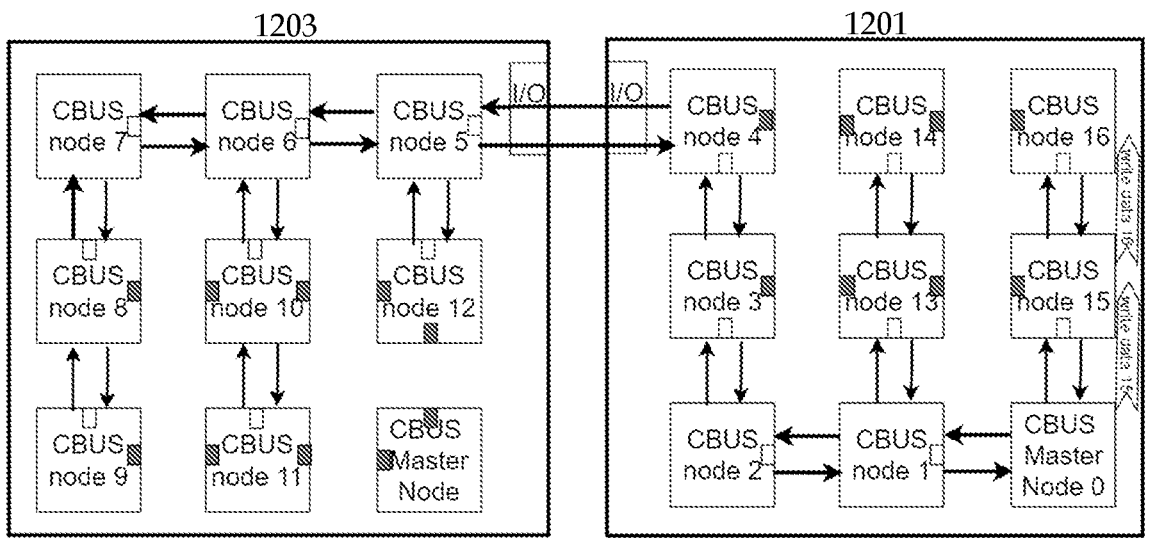
Figure 15D:
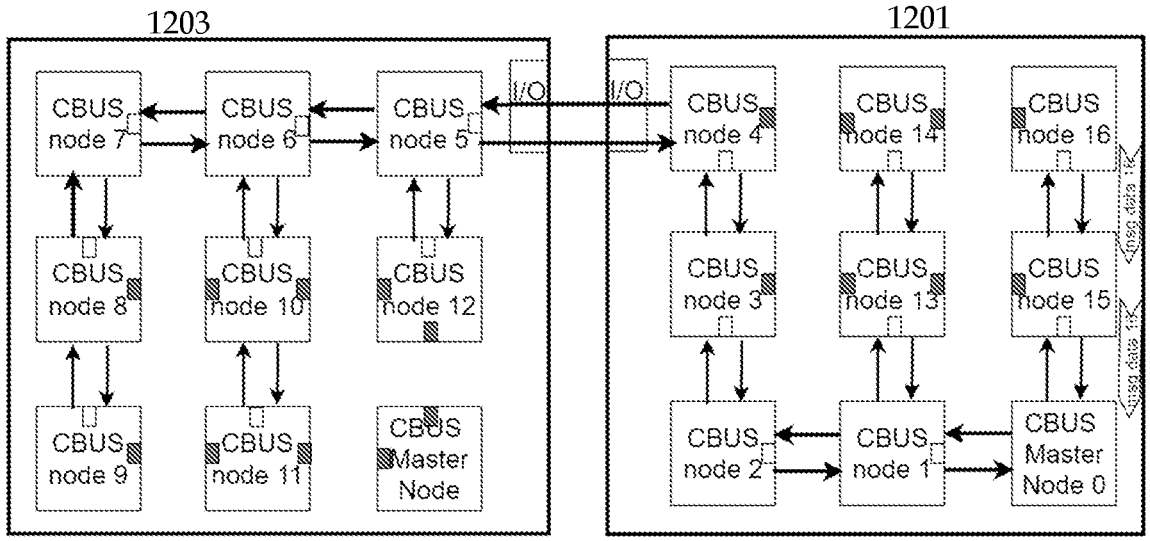

As shown in FIG. 14H, with the same manner, CBUS Node-5 receives the message packet from CBUS Node-6. It still has a downstream port which has not done enumeration. It will send a write request with data value of '12'. to its bottom port which is its second downstream port. The CBUS Node below CBUS Node-5 will get the write request and updates its own node ID to '12'. As shown in FIG. 14I, it then returns a message packet with data value of '12' to CBUS Node-5. CBUS Node-5, having completed the enumeration on all both its downstream ports, now passes the message packet across the chiplet boundary, to CBUS Node-4.

The upstream Message packet is passed from CBUS Node-4 to CBUS Node-3, from CBUS Node-3 to CBUS Node-2, and then to CBUS Node-1. CBUS Node-1 receives the message packet and sees the data value of '12', and it recognizes this as the highest ID of the CBUS Nodes downstream of its left port. It sends an enumeration write request with data value of '13' to its top port, which is its second downstream port.

In similar manner, the two CBUS Nodes above CBUS Node-1 get assigned with node ID of 13 and 14 respectively. They will return message packet with data value 14 back to CBUS Node-1, which passes it back to CBUS Master Node.

CBUS Master Node receives the message packet at its left port, which indicates that the enumeration process downstream of its left port is complete, and the highest ID is 14. So, CBUS Master Node will send the enumeration write request to its top port with the data value of 15. The two CBUS Nodes above CBUS Master Node will get assigned with the ID of 15 and 16 respectively. They will return the message packet with data value of 16 back to CBUS Master Node.

After receiving the message of packet with data value of '16' on its top port, CBUS Master Node deems the enumeration process for all CBUS Nodes is complete with 16 CBUS Nodes.

In the case where dynamic discovery between 2 chiplets is not desirable and we want to maintain separate CBUS network in each chiplet respectively, but still want to have a way for the 2 CBUS networks to communicate, then the CBUS networks between 2 chiplets can still communicate via a mailbox mechanism. As can be seen from FIGS. 16A and 16B, a mailbox is implemented in each chiplet. There is also a CBUS master on each chiplet. It is assumed that the network discovery and enumeration is complete in each chiplet.

The present invention also discloses a method of data transfer between secondary networks (101A, 101B) in multiple ICs (1201, 1203), which is done by the following steps. In step (i), a first master network element (103A) of a first secondary network (101A) of a first IC (1201) transmitting write request data packet, through at least one downstream neighbouring basic network element (105) in said first secondary network (101A), until said write request data packet reaching a basic network element (105) neighbouring a first clock synchronization mechanism (1205A) in said first IC (1201). In step (ii), said first clock synchronization mechanism (1205A) transmitting said write request data packet to a second clock synchronization mechanism (1205B) in a second IC (1203). In step (iii), said second clock synchronization mechanism (1205B) transmitting said write request packet to a second mailbox register (1605B) in said second IC (1203); wherein intended destination of second basic network element (105B) in said second secondary network (101B) receiving an interrupt from said second mailbox register (1605B). In step (iv), said intended destination of second basic network element (105B) transmitting message data packet to upstream neighbouring second basic network element (105B) until said message data packet reaches a second master network element (103B) of a second secondary network (101B). In step (v), said second master network element (103B) transmitting read request data packet to said second mailbox register (1605B) to read and interpret said write request data packet from said first master network element (103A).

Figure 16A:
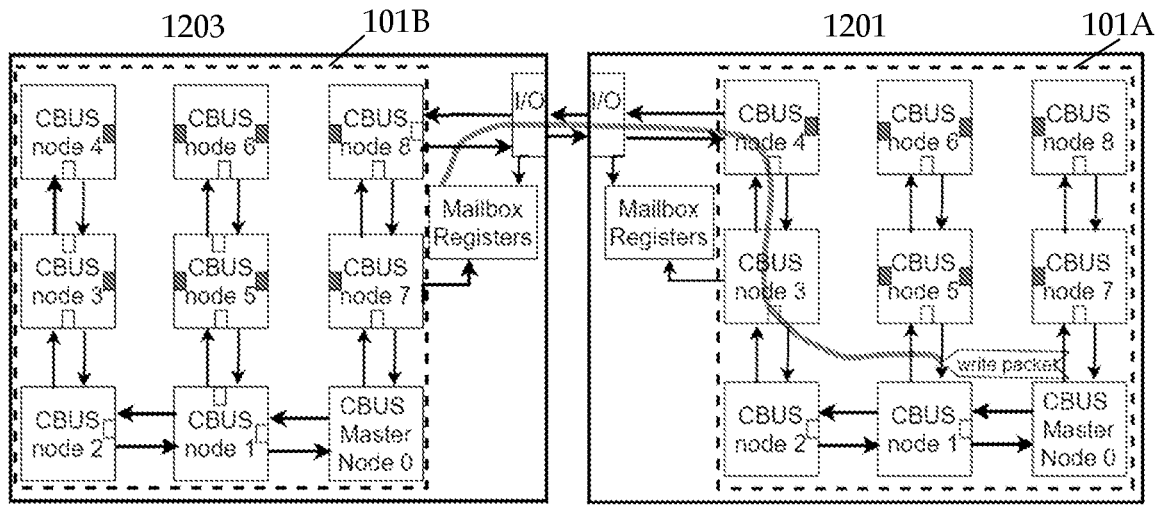
FIGS. 16A and 16B are block diagrams showing an example of the implementation of the data transfer using mailbox.
Figure 16B:
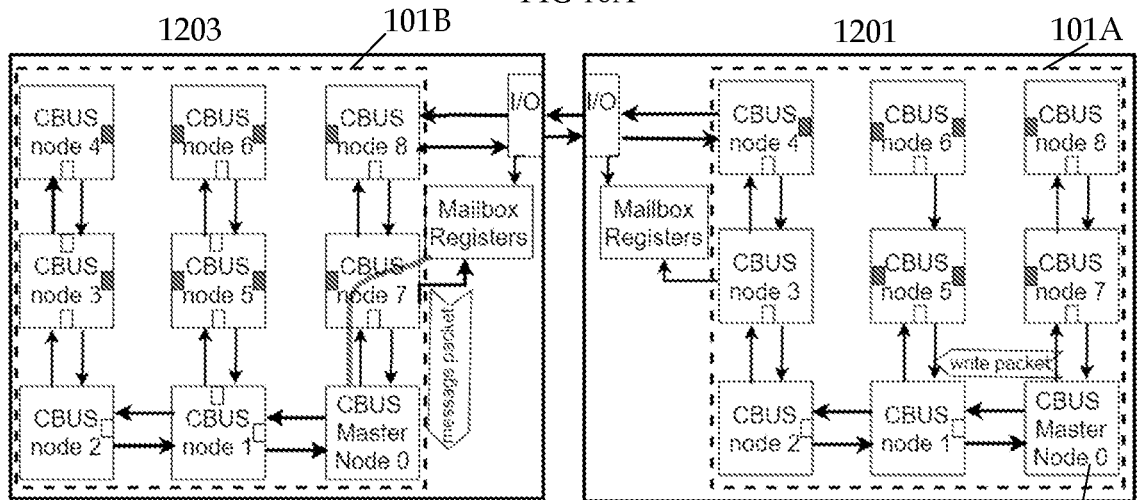

FIGS. 16A and 16B show a flow of an example of the implementation of the data transfer using mailbox. As shown in FIG. 16A, if the first IC (1201) wishes to communicate with the second IC (1203), a first master network element (103A) (referred to in this example as CBUS Master Node 0 on the first IC (1201)) will send a write packet, through at least one neighbouring basic network element, to CBUS Node-4. CBUS Node-4 will pass along the write packet to the I/O interface, crossing the IC/chiplet boundary and into the second IC's (1203) I/O interface. The second IC's (1203) I/O interface receives the incoming write packet but it is not able to route it, and so it will deposit the write packet (including the write address and data) into its mailbox registers.

When the mailbox registers in the second IC (1203) is written, it triggers an interrupt on first IC's (1201) CBUS Node-3 which causes a message packet to be sent upstream back to said first IC's CBUS Master Node 0. CBUS Node-3 is chosen because it is the CBUS node nearest to the first IC's mailbox registers in this example. The second IC's CBUS Master Node 0 will then issue a read packet to read from the second IC's mailbox registers. It will then be able to read and interpret the write packet from the first IC (1201), as shown in FIG. 16B.

In a similar fashion, the CBUS Master on the left chiplet can also send a write packet to the mailbox of the right chiplet. Hence this completes the 2-way communication between the chiplets.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

What is claimed is:

1. A method of transferring configuration, management, debug information and asynchronous events between at least one network-on-chip (NOC) and external interface, comprising the steps of:
   i. at least one second configuration bus (CBUS) network element of at least one secondary network sending transmit credit signal of '1' through at least one transmit credit channel (txcredit) to at least one first CBUS network element in clock cycle equivalent to amount of bit storage available in said second CBUS network element for said first CBUS network element to send data;
   ii. said first CBUS network element transferring data through at least one transmit data channel (txdata) to said second CBUS network element;
   iii. if said data transferred through said transmit data channel (txdata) from said first CBUS network element to said second CBUS network element when said first CBUS network element transmitting transmit valid signal of '1' through at least one transmit valid channel (txvalid) to said second CBUS network element, said second CBUS network element accepting said data as valid;
   wherein said steps (i) to (iii) are also done for communication in the opposite direction, whereby said first CBUS network element sending transmit credit signal of '1' through at least one receive credit channel (rxcredit) to said second CBUS network element, said second CBUS network element transferring data through at least one receive data channel (rxdata) to said first CBUS network element, and if said data transferred through said receive data channel (rxdata) from said second CBUS network element to said first CBUS network element when said second CBUS network element transmitting receive valid signal of '1' through at least one receive valid channel (rxvalid) to said first CBUS network element, said first CBUS network element accepting said data as valid.

2. The method of transferring configuration, management, debug information and asynchronous events between at least one NOC and external interface as claimed in claim 1, wherein said CBUS network element is a master network element or a basic network element; and said NOC comprises at least one NOC element comprising at least one main router, at least one request node, at least one home node or combination thereof.

3. The method of transferring configuration, management, debug information and asynchronous events between at least one NOC and external interface as claimed in claim 2, wherein said basic network element or said master network element comprises:
- at least one port capable of being in connection with at least one port of another network element;
- at least one first-in-first-out (FIFO) buffer connected to said port buffering data being transmitted from or received by said port;
- at least one arbiter connected to said FIFO buffer selecting data packets to be transmitted from said port;
- at least one configuration register connected between said FIFO buffer and said arbiter.

4. The method of transferring configuration, management, debug information and asynchronous events between at least one NOC and external interface as claimed in claim 3, wherein said port comprises an upstream port facing the direction of said master network element.

5. The method of transferring configuration, management, debug information and asynchronous events between at least one NOC and external interface as claimed in claim 4, further comprising at least one downstream port connected to the upstream port of a neighbouring basic network element.

6. The method of transferring configuration, management, debug information and asynchronous events between at least one NOC and external interface as claimed in claim 5, wherein said data comprises at least one data packet for write request, read request, read completion, message or combination thereof.

7. The method of transferring configuration, management, debug information and asynchronous events between at least one NOC and external interface as claimed in claim 6, wherein said write request data packet or read request data packet is transmitted by said downstream port.

8. The method of transferring configuration, management, debug information and asynchronous events between at least one NOC and external interface as claimed in claim 7, wherein upon said basic network element receiving said read request data packet or write request data packet, said basic network element transmitting said read request data packet or write request data packet through said downstream port to at least one neighbouring basic network element.

9. The method of transferring configuration, management, debug information and asynchronous events between at least one NOC and external interface as claimed in claim 8, wherein assignment and stubbing of said port is automatic.

10. The method of transferring configuration, management, debug information and asynchronous events between at least one NOC and external interface as claimed in claim 9, wherein said assignment and stubbing of said port is done using the following steps:
  i. said master network element transmitting transmit 'sync' signal through at least one transmit sync channel (txsync) to said port of all neighbouring basic network elements;
  ii. port of said basic network elements which receives said transmit 'sync' signal is assigned as upstream port while other ports of said basic network elements that do not receive said transmit 'sync' signal is assigned as downstream port; wherein if a plurality of ports in one basic network element receiving said transmit 'sync' signal, one of said plurality of ports is assigned, based on predetermined criteria, as upstream port while other unchosen ports among said plurality of ports are assigned as stubbed port;
  iii. upon said port being assigned as upstream port, said basic network element transmitting receive 'sync' signal through at least one receive sync channel (rxsync) back to the CBUS network element that sent said transmit 'sync' signal; while said basic network element transmitting transmit 'sync' signal through at least one transmit sync channel (txsync) to ports of all other neighbouring basic network elements; while said stubbed port does not transmit receive 'sync' signal; wherein upstream port of a neighbouring CBUS network element which is supposed to receive said receive 'sync' signal from port being assigned as stubbed ports is assigned as stubbed port;

wherein steps (ii) and (iii) are repeated until all ports in said CBUS elements are assigned and stubbed.

11. The method of transferring configuration, management, debug information and asynchronous events between at least one NOC and external interface as claimed in claim 10, wherein for assignment and stubbing of said port in a plurality of secondary networks across multiple ICs, whereby said plurality of secondary networks comprise multiple master network elements, only one master network element is chosen to perform said assignment and stubbing while the other ports in the other master network elements are stubbed by at least one external microcontroller.

12. The method of transferring configuration, management, debug information and asynchronous events between at least one NOC and external interface as claimed in claim 11, wherein after assignment and stubbing of said port in plurality of secondary networks across multiple ICs, said method further comprises a method of dynamic assignment of node ID of CBUS element in said plurality of secondary networks across said multiple ICs, comprising the steps of:
  i. a chosen master network element transmitting write request data packet through its first priority downstream port to the neighbouring basic network element; wherein said write request data packet comprises a node ID counter value and a predetermined address code identifying said write request data packet as an enumeration write;
  ii. upon said neighbouring basic network element receiving said write request data packet from said chosen master network element, said basic network element updating its own node ID according to the latest node ID counter value;
  iii. said basic network element adding value of said node ID counter value by '1' in said write request data packet before transmitting said write request data packet to the subsequent neighbouring basic network element through its first priority downstream port;
  wherein said step (ii) and (iii) are repeated within or across said multiple ICs until there is no further downstream neighbouring basic network element, whereby the latest basic network element is a first end basic network element;

said method further comprises the step:
  iv. upon said first end basic network element updating its own node ID according to the latest node ID counter value, said first end basic network element adding value of said node ID counter value by '1' in a message data packet before transmitting said message data packet, through its subsequent priority upstream port, to an upstream neighbouring basic network element which has unassigned node ID;
  v. upon said upstream neighbouring basic network element receiving said message data packet from its downstream basic network element, said upstream neighbouring basic network element updating its own node ID according to the latest node ID counter value if said upstream neighbouring basic network element has unassigned node ID; while said upstream neighbouring basic network element maintaining its existing node ID if said upstream neighbouring basic network element has its assigned node ID;

vi. said upstream neighbouring basic network element checking whether there is unassigned downstream neighbouring basic network element; wherein if there is unassigned downstream neighbouring basic network element, said basic network element transmitting a write request data packet with the latest node ID counter value to said unassigned downstream neighbouring basic network element until no further downstream neighbouring basic network element is available; wherein if there is no unassigned downstream neighbouring basic network element, said basic network element transmitting a message data packet with the latest node ID counter value to its upstream neighbouring basic network element;

wherein steps (v) and (vi) are repeated until said chosen master network element if reached.

13. The method of transferring configuration, management, debug information and asynchronous events between at least one NOC and external interface as claimed in claim 12, wherein data transfer between secondary networks in multiple ICs is done by the steps of:
    i. a first master network element of a first secondary network of a first IC transmitting write request data packet, through at least one downstream neighbouring basic network element in said first secondary network, until said write request data packet reaching a basic network element neighbouring a first clock synchronization mechanism in said first IC;
    ii. said first clock synchronization mechanism transmitting said write request data packet to a second clock synchronization mechanism in a second IC;
    iii. said second clock synchronization mechanism transmitting said write request packet to a second mailbox register in said second IC; wherein intended destination of second basic network element in said second secondary network receiving an interrupt from said second mailbox register;
    iv. said intended destination of second basic network element transmitting message data packet to upstream neighbouring second basic network element until said message data packet reaches a second master network element of a second secondary network;
    v. said second master network element transmitting read request data packet to said second mailbox register to read and interpret said write request data packet from said first master network element.

14. The method of transferring configuration, management, debug information and asynchronous events between at least one NOC and external interface as claimed in claim 9, wherein said assignment and stubbing of said port is done using the following steps:
    i. said master network element transmitting transmit 'sync' signal through a transmit sync channel (txsync) of all of its downstream port to the port of all neighbouring basic network elements;
    ii. port of said basic network elements which receives said transmit 'sync' signal is pre-assigned as upstream port while other ports of said basic network elements that do not receive said transmit 'sync' signal is pre-assigned as downstream port; wherein if a plurality of ports in one basic network element receiving said transmit 'sync' signal from a plurality of upstream basic network elements, only one of said plurality of ports is pre-assigned as upstream port, based on predetermined criteria;
    iii. all said downstream ports of said basic network element transmitting transmit 'sync' signal through at least one transmit sync channel (txsync) to their corresponding ports of other neighbouring basic network elements;

wherein steps (ii) and (iii) are repeated until all ports in said basic network elements are pre-assigned;

wherein said method further comprising the steps:
    iv. once all the ports in all the basic network elements are pre-assigned, the basic network element which does not have any downstream port transmitting receive acknowledge signal through receive acknowledge channel (rxack) of its upstream port to its upstream basic network element;
    V. upon said downstream port of upstream basic network element receiving said receive acknowledge signal from said downstream basic network element that are not stubbed, said basic network element assigning pre-assigned upstream port as upstream port, assigning ports that have transmitted and received transmit 'sync' signal as stubbed port, and assigning other ports as downstream ports; before said basic network element transmitting receive acknowledge signal to its upstream basic network element;

wherein step (v) is repeated until all ports of said basic network elements are assigned.

15. The method of transferring configuration, management, debug information and asynchronous events between at least one NOC and external interface as claimed in claim 8, wherein said NOC enables system coherency by establishing a handshake between a 'system coherency request signal' (SYSCOREQ) and a 'system coherency acknowledge signal' (SYSCOACK), comprising the steps of:
    i. first NOC element asserting said SYSCOREQ signal, wherein said asserted SYSCOREQ signal is captured by at least one third basic network element of said secondary network;
    ii. said third basic network element packetizing said asserted SYSCOREQ signal into a message data packet;
    iii. said third basic network element transmitting said message data packet with asserted SYSCOREQ signal to the neighbouring basic network element up to said master network element of said secondary network;
    iv. said master network element triggering a message interrupt to at least one external microcontroller, for said external microcontroller to read said message data packet from master network element to identify location of said first NOC element;
    V. said master network element transmitting write request data packet through said downstream port to the neighbouring basic network element; wherein said write request data packet comprises node identification (ID) field equivalent to a fourth basic network element's ID, before said fourth basic network element setting specific bit at its coherency request register of its local register equivalent to said location of said first NOC element;
    vi. said fourth basic network element asserting said SYSCOREQ signal with location of said first NOC element to at least one second NOC element;
    vii. said second NOC element asserting SYSCOACK signal with location of said first NOC element to said fourth basic network element;

viii. said fourth basic network element transmitting message data packet with asserted SYSCOACK signal with location of said first NOC element to a neighbouring CBUS network element up to said master network element of said secondary network;

ix said master network element transmitting write request data packet through said downstream port to the neighbouring basic network element; wherein said write request data packet comprises node ID field equivalent to said third basic network element's ID, before said third basic network element setting specific bit at its coherency acknowledge register of its local register equivalent to the location of said second NOC element.

16. The method of transferring configuration, management, debug information and asynchronous events between at least one NOC and external interface as claimed in claim 8, wherein said NOC disables system coherency by establishing a handshake between a 'system coherency request signal' (SYSCOREQ) and a 'system coherency acknowledge signal' (SYSCOACK), comprising the steps of:
  i. first NOC element de-asserting said SYSCOREQ signal, wherein said de-asserted SYSCOREQ signal is captured by at least one third basic network element of said secondary network;
  ii. said third basic network element packetizing said de-asserted SYSCOREQ signal into a message data packet;
  iii. said third basic network element transmitting said message data packet with de-asserted SYSCOREQ signal to a neighbouring CBUS network element up to said master network element of said secondary network;
  iv. said master network element triggering a message interrupt to at least one external microcontroller, for said external microcontroller to read said message data packet from master network element to identify location of said first NOC element;
  V. said master network element transmitting write request data packet through said downstream port to the neighbouring basic network element; wherein said write request data packet comprises node identification (ID) field equivalent to a fourth basic network element's ID, before said fourth basic network element resetting specific bit at its coherency request register of its local register equivalent to said location of said first NOC element;
  vi. said fourth basic network element de-asserting said SYSCOREQ signal with location of said first NOC element to at least one second NOC element;
  vii. said second NOC element de-asserting SYSCOACK signal with location of said first NOC element to said fourth basic network element;
  viii. said fourth basic network element transmitting message data packet with de-asserted SYSCOACK signal with location of said first NOC element to the neighbouring CBUS network element up to said master network element of said secondary network;
  ix. said master network element transmitting write request data packet through said downstream port to the neighbouring basic network element; wherein said write request data packet comprises node ID field equivalent to said third basic network element's ID, before said third basic network element resetting specific bit at its coherency acknowledge register of its local register equivalent to the location of said second NOC element.

17. The method of transferring configuration, management, debug information and asynchronous events between at least one NOC and external interface as claimed in claim 6, wherein said read completion data packet is transmitted by said upstream port.

18. The method of transferring configuration, management, debug information and asynchronous events between at least one NOC and external interface as claimed in claim 17, wherein upon said basic network element receiving said read completion data packet, said basic network element transmitting read completion data packet through said upstream port to the neighbouring basic network element until reaching said master network element.

19. The method of transferring configuration, management, debug information and asynchronous events between at least one NOC and external interface as claimed in claim 18, wherein assignment and stubbing of said port is automatic.

20. The method of transferring configuration, management, debug information and asynchronous events between at least one NOC and external interface as claimed in claim 18, wherein said NOC enables system coherency by establishing a handshake between a 'system coherency request signal' (SYSCOREQ) and a 'system coherency acknowledge signal' (SYSCOACK), comprising the steps of:
  i. first NOC element asserting said SYSCOREQ signal, wherein said asserted SYSCOREQ signal is captured by at least one third basic network element of said secondary network;
  ii. said third basic network element packetizing said asserted SYSCOREQ signal into a message data packet;
  iii. said third basic network element transmitting said message data packet with asserted SYSCOREQ signal to the neighbouring basic network element up to said master network element of said secondary network;
  iv. said master network element triggering a message interrupt to at least one external microcontroller, for said external microcontroller to read said message data packet from master network element to identify location of said first NOC element;
  V. said master network element transmitting write request data packet through said downstream port to the neighbouring basic network element; wherein said write request data packet comprises node identification (ID) field equivalent to a fourth basic network element's ID, before said fourth basic network element setting specific bit at its coherency request register of its local register equivalent to said location of said first NOC element;
  vi. said fourth basic network element asserting said SYSCOREQ signal with location of said first NOC element to at least one second NOC element;
  vii. said second NOC element asserting SYSCOACK signal with location of said first NOC element to said fourth basic network element;
  viii. said fourth basic network element transmitting message data packet with asserted SYSCOACK signal with location of said first NOC element to a neighbouring CBUS network element up to said master network element of said secondary network;
  ix said master network element transmitting write request data packet through said downstream port to the neighbouring basic network element; wherein said write request data packet comprises node ID field equivalent to said third basic network element's ID, before said third basic network element setting specific bit at its coherency acknowledge register of its local register equivalent to the location of said second NOC element.

21. The method of transferring configuration, management, debug information and asynchronous events between at least one NOC and external interface as claimed in claim 18, wherein said NOC disables system coherency by establishing a handshake between a 'system coherency request signal' (SYSCOREQ) and a 'system coherency acknowledge signal' (SYSCOACK), comprising the steps of:
  i. first NOC element de-asserting said SYSCOREQ signal, wherein said de-asserted SYSCOREQ signal is captured by at least one third basic network element of said secondary network;
  ii. said third basic network element packetizing said de-asserted SYSCOREQ signal into a message data packet;
  iii. said third basic network element transmitting said message data packet with de-asserted SYSCOREQ signal to a neighbouring CBUS network element up to said master network element of said secondary network;
  iv. said master network element triggering a message interrupt to at least one external microcontroller, for said external microcontroller to read said message data packet from master network element to identify location of said first NOC element;
  V. said master network element transmitting write request data packet through said downstream port to the neighbouring basic network element; wherein said write request data packet comprises node identification (ID) field equivalent to a fourth basic network element's ID, before said fourth basic network element resetting specific bit at its coherency request register of its local register equivalent to said location of said first NOC element;
  vi. said fourth basic network element de-asserting said SYSCOREQ signal with location of said first NOC element to at least one second NOC element;
  vii. said second NOC element de-asserting SYSCOACK signal with location of said first NOC element to said fourth basic network element;
  viii. said fourth basic network element transmitting message data packet with de-asserted SYSCOACK signal with location of said first NOC element to the neighbouring CBUS network element up to said master network element of said secondary network;
  ix. said master network element transmitting write request data packet through said downstream port to the neighbouring basic network element; wherein said write request data packet comprises node ID field equivalent to said third basic network element's ID, before said third basic network element resetting specific bit at its coherency acknowledge register of its local register equivalent to the location of said second NOC element.

22. The method of transferring configuration, management, debug information and asynchronous events between at least one NOC and external interface as claimed in claim 6, wherein said CBUS network element converting said read request data packet or write request data packet to read signal or write signal respectively to trigger a specific event external to said CBUS element.

23. The method of transferring configuration, management, debug information and asynchronous events between at least one NOC and external interface as claimed in claim 22, wherein said conversion is done using at least one configuration register.

24. The method of transferring configuration, management, debug information and asynchronous events between at least one NOC and external interface as claimed in claim 6, wherein said write request data packet is broadcast write or targeted write; or
  wherein said read request data packet is targeted read.

25. The method of transferring configuration, management, debug information and asynchronous events between at least one NOC and external interface as claimed in claim 1, wherein said transmit credit channel (txcredit), transmit data channel (txdata), transmit valid channel (txvalid), receive credit channel (rxcredit), receive data channel (rxdata) and receive valid channel (rxvalid) between said two CBUS network element across multiple integrated circuits (ICs) is buffered by at least one clock synchronization mechanism, wherein said clock synchronization mechanism further comprises a clock channel (txclk) synching signals for said transmit credit channel (txcredit), transmit data channel (txdata), transmit valid channel (txvalid), receive credit channel (rxcredit), receive data channel (rxdata) and receive valid channel (rxvalid) to the local clock.

26. The method of transferring configuration, management, debug information and asynchronous events between at least one NOC and external interface as claimed in claim 1, wherein said transmit credit channel (txcredit), transmit data channel (txdata), transmit valid channel (txvalid), receive credit channel (rxcredit), receive data channel (rxdata) and receive valid channel (rxvalid) between said two CBUS network element in the same secondary network is buffered by at least one clock synchronization mechanism, wherein said clock synchronization mechanism further comprises a clock channel (txclk) synching signals for said transmit credit channel (txcredit), transmit data channel (txdata), transmit valid channel (txvalid), receive credit channel (rxcredit), receive data channel (rxdata) and receive valid channel (rxvalid) to the local clock.

27. The method of transferring configuration, management, debug information and asynchronous events between at least one NOC and external interface as claimed in claim 1, wherein said transmit credit channel (txcredit), transmit data channel (txdata), transmit valid channel (txvalid), receive credit channel (rxcredit), receive data channel (rxdata) and receive valid channel (rxvalid) between said two CBUS network element across multiple integrated circuits (ICs) is buffered by at least one clock synchronization mechanism; or
  said transmit credit channel (txcredit), transmit data channel (txdata), transmit valid channel (txvalid), receive credit channel (rxcredit), receive data channel (rxdata) and receive valid channel (rxvalid) between said two CBUS network element in the same secondary network is buffered by at least one clock synchronization mechanism;
  wherein said clock synchronization mechanism is asynchronous first-in-first-out (FIFO) buffer, and further comprises a clock channel (txclk) synching signals for said transmit credit channel (txcredit), transmit data channel (txdata), transmit valid channel (txvalid), receive credit channel (rxcredit), receive data channel (rxdata) and receive valid channel (rxvalid) to the local clock.

28. The method of transferring configuration, management, debug information and asynchronous events between at least one NOC and external interface as claimed in claim 1, wherein said transmit credit channel (txcredit), transmit data channel (txdata), transmit valid channel (txvalid), receive credit channel (rxcredit), receive data channel (rxdata) and receive valid channel (rxvalid) between said two CBUS network element across multiple integrated circuits (ICs) is buffered by at least one portion of the NOC, wherein signals for said transmit credit channel (txcredit), transmit data channel (txdata), transmit valid channel (txvalid), receive credit channel (rxcredit), receive data channel (rxdata) and receive valid channel (rxvalid) are encapsulated into at least one data packet transferred between multiple NOC elements.

29. A secondary network, comprising:
a master network element; and
a plurality of basic network elements;
wherein said secondary network connects at least one network-on-chip (NOC) and external interface,
wherein an interface between a first basic network element and a second basic network element comprises:
a transmit data channel (txdata) from said first basic network element to said second basic network element;
a transmit valid channel (txvalid) from said first basic network element to said second basic network element;
a transmit synchronization channel (txsync) from said first basic network element to said second basic network element;
a receive credit channel (rxcredit) from said first basic network element to said second basic network element;
a receive data channel (rxdata) from said second basic network element to said first basic network element;
a receive valid channel (rxvalid) from said second basic network element to said first basic network element;
a receive synchronization channel (rxsync) from said second basic network element to said first basic network element; and
a transmit credit channel (txcredit) from said second basic network element to said first basic network element.

30. The secondary network as claimed in claim 29, wherein said transmit data channel (txdata) and said receive data channel (rxdata) transmits serial data of 1-bit; or
said transmit data channel (txdata) and said receive data channel (rxdata) are capable of transmitting or receiving data packets for write request, read request, read completion, message or combination thereof.

31. A secondary network, comprising:
a master network element; and
a plurality of basic network elements;
wherein said secondary network connects at least one network-on-chip (NOC) and external interface,
wherein an interface between said master network element and a neighbouring basic network element, comprises:
a transmit data channel (txdata) from said master network element to a second basic network element;
a transmit valid channel (txvalid) from said master network element to said second basic network element;
a transmit synchronization channel (txsync) from said master network element to said second basic network element;
a receive credit channel (rxcredit) from said master network element to said second basic network element;
a receive data channel (rxdata) from said second basic network element to said master network element;
a receive valid channel (rxvalid) from said second basic network element to said master network element;
a receive synchronization channel (rxsync) from said second basic network element to said master network element; and
a transmit credit channel (txcredit) from said second basic network element to said master network element.

32. The secondary network as claimed in claim 31, wherein said transmit data channel (txdata) and said receive data channel (rxdata) are capable of transmitting or receiving data packets for write request, read request, read completion, message or combination thereof; or said transmit data channel (txdata) and said receive data channel (rxdata) transmits serial data of 1-bit.

33. A secondary network, comprising:
a master network element; and
a plurality of basic network elements;
wherein said secondary network connects at least one network-on-chip (NOC) and external interface,
wherein said second network further comprises at least one first clock synchronization mechanism inside a first configuration bus (CBUS) network element and at least one second clock synchronization mechanism inside a second configuration bus (CBUS) network element for asynchronized clocking between two configuration bus (CBUS) network elements in one secondary network or said first clock synchronization mechanism inside a first secondary network while at least one second clock synchronization mechanism inside a second secondary network, for transmission of data across multiple integrated circuits (ICs).

34. The secondary network as claimed in claim 33, wherein said clock synchronization is an asynchronous first-in-first-out (FIFO) buffer.

35. The secondary network as claimed in claim 33, wherein said secondary network further comprises at least one mailbox register connecting at least one said basic network element with said clock synchronization mechanism.

* * * * *